US009823398B2

(12) United States Patent
Suganuma

(10) Patent No.: US 9,823,398 B2
(45) Date of Patent: Nov. 21, 2017

(54) POLARIZER AND OPTICAL ELEMENT HAVING POLARIZER

(71) Applicant: Enplas Corporation, Saitama (JP)

(72) Inventor: Takayoshi Suganuma, Saitama (JP)

(73) Assignee: Enplas Corporation, Saitama (JP)

( * ) Notice: Subject to any disclaimer, the term of this patent is extended or adjusted under 35 U.S.C. 154(b) by 21 days.

(21) Appl. No.: 14/967,774

(22) Filed: Dec. 14, 2015

(65) Prior Publication Data
US 2016/0170112 A1    Jun. 16, 2016

(30) Foreign Application Priority Data

Dec. 15, 2014  (JP) .................................. 2014-253234

(51) Int. Cl.
*G02B 5/30* (2006.01)

(52) U.S. Cl.
CPC ............. *G02B 5/3058* (2013.01); *G02B 5/30* (2013.01)

(58) Field of Classification Search
CPC ...... G02B 5/30; G02B 5/1833; G02B 5/3025; G02B 5/3058; G02B 27/286; G02B 27/288
USPC .... 359/485.01, 485.03, 485.05, 487.03, 569, 359/586
See application file for complete search history.

(56) References Cited

U.S. PATENT DOCUMENTS

| 5,245,471 A  * | 9/1993  | Iwatsuka .............. | G02B 5/3083 359/484.03 |
| 7,203,001 B2 * | 4/2007  | Deng ................... | G02B 5/3083 359/485.03 |
| 2005/0088739 A1* | 4/2005 | Chiu .................... | G02B 5/3058 359/485.05 |
| 2008/0303986 A1* | 12/2008 | Yamaki ................ | G02B 5/3058 349/96 |
| 2009/0162623 A1* | 6/2009 | Foresti .................. | B29C 59/046 428/210 |
| 2010/0091236 A1* | 4/2010 | Matera ............. | B29D 11/00634 351/49 |
| 2012/0268809 A1* | 10/2012 | Guo ........................ | G02F 1/216 359/359 |
| 2013/0222770 A1* | 8/2013 | Tomiyama ........... | G02B 5/3025 353/20 |

FOREIGN PATENT DOCUMENTS

JP    2002-258034 A    9/2002

OTHER PUBLICATIONS

L.Mashev, and E. Popov, "Zero order anomaly of dielectric coated gratings", Optics Communications, vol. 55, No. 6, pp. 377-380, Oct. 15, 1985.
S.S. Wang and R. Magnusson, "Theory and applications of guided-mode resonance filters", Applied Optics, vol. 32 No. 14, pp. 2606-2613, May 10, 1993.

* cited by examiner

*Primary Examiner* — Frank Font
(74) *Attorney, Agent, or Firm* — Brundidge & Stanger, P.C.

(57) ABSTRACT

A polarizer according to the present invention includes a thin film with a constant thickness composed of a dielectric, and a plurality of slit-shaped through-holes each having the same width formed in the thin film and extending in a first direction. The plurality of through-holes are arranged on a surface of the thin film at a constant interval in a second direction perpendicular to the first direction.

15 Claims, 17 Drawing Sheets

POLARIZER AND OPTICAL ELEMENT HAVING POLARIZER

CROSS REFERENCE TO RELATED APPLICATIONS

This application is entitled to and claims the benefit of Japanese Patent Application No. 2014-253234, filed on Dec. 15, 2014, the disclosure of which including the specification, drawings and abstract is incorporated herein by reference in its entirety.

TECHNICAL FIELD

The present invention relates to a polarizer utilizing a mode resonance effect and an optical element having the polarizer.

BACKGROUND ART

In recent years, fine processing technologies including lithography have achieved remarkable progress. In association with this progress, applied studies have been increasingly conducted, of a sub-wavelength diffraction grating having a period structure less than a wavelength to be irradiated. Examples of the known applied studies include a guided-mode resonance filter (also referred to as "guided-mode resonant filter") utilizing a diffraction grating (e.g., Non-Patent Literatures (hereinafter, abbreviated as "NPLs") 1 and 2).

NPL 1 discloses a guided-mode resonance filter utilizing a diffraction grating. Further, NPL 2 discloses a guided-mode resonance filter with a plane diffraction grating having two different dielectric constants, in which a condition is known where guided modes are coupled at waveguide or diffraction light by the diffraction grating.

As for the guided-mode resonance filter, several basic structures are known. FIG. 1 is an explanatory sectional view of a guided-mode resonance filter. FIG. 1A is a sectional view of guided-mode resonance filter 10 having substrate 12 and diffraction grating part 14, and FIG. 1B is a sectional view of guided-mode resonance filter 20 having substrate 22 and waveguide layer (diffraction grating) 24 formed on substrate 22. It is noted that hatching is omitted in FIGS. 1A and 1B.

As illustrated in FIG. 1A, guided-mode resonance filter 10 of this type has substrate 12 and diffraction grating part 14 disposed on substrate 12. Diffraction grating part 14 has a plurality of high refractive index parts 16 and a plurality of low refractive index parts 18. In guided-mode resonance filter 10 of this type, diffraction grating part 14 itself functions as a waveguide layer. Guided-mode resonance filter 10 illustrated in FIG. 1A has a simple structure, and exhibits high reflection diffraction efficiency in a peak wavelength for TE polarized light. On the other hand, this guided-mode resonance filter 10 has high Fresnel reflection for TM polarized light, and thus exhibits low transmission diffraction efficiency.

Further, as illustrated in FIG. 1B, guided-mode resonance filter 20 of this type has substrate 22 and waveguide layer 24 disposed on substrate 22. Waveguide layer 24 has a plurality of high refractive index parts 26 and a plurality of low refractive index parts 28. In guided-mode resonance filter 20 illustrated in FIG. 1B, the refractive index of substrate 22 ($n_{sub}$) is set at 1.52, the refractive index of high refractive index part 26 ($n_H$) is set at 2.20, the refractive index of low refractive index part 28 ($n_L$) is set at 1.80, diffraction grating period ($\Lambda$) is set at 359 nm, diffraction grating filling factor f is set at 0.50, and the depth h of low refractive index part 28 is set at 267 nm. The results of the calculation of transmission diffraction efficiency and reflection diffraction efficiency by RCWA method in the case where TE polarized light and TM polarized light enter the diffraction grating are shown in FIGS. 2A and 2B.

FIG. 2A is a graph showing the transmission diffraction efficiency or reflection diffraction efficiency for TE polarized light in the range of 600 to 700 nm of light wavelength $\lambda$, and FIG. 2B is a graph showing the transmission diffraction efficiency and reflection diffraction efficiency for TM polarized light in the range of 600 to 700 nm of light wavelength $\lambda$. The abscissa in FIGS. 2A and 2B indicates light wavelength $\lambda$ (nm). In addition, the ordinate in FIG. 2A indicates the transmission diffraction efficiency (%) or reflection diffraction efficiency (%) for TE polarized light, and the ordinate in FIG. 2B indicates the transmission diffraction efficiency (%) or reflection diffraction efficiency (%) for TM polarized light. The solid line in FIG. 2A indicates the transmission diffraction efficiency for TE polarized light, and the broken line indicates the reflection diffraction efficiency for TE polarized light. The solid line in FIG. 2B indicates the transmission diffraction efficiency for TM polarized light, and the broken line indicates the reflection diffraction efficiency for TM polarized light. As shown in FIGS. 2A and 2B, in TE polarized light, the peak wavelength $\lambda$ of a reflection spectrum was 650 nm, whereas in TM polarized light, the peak wavelength $\lambda$ of a reflection spectrum was 640 nm Thus, a guided-mode resonance filter in which a diffraction grating made of media having two different refractive indexes is formed on substrate 22 is generally known to function as a reflection type band pass filter (notch filter) for each of TE polarized light and TM polarized light in wavelengths distant a little. In this case, large refractive index difference is generated in each of diffraction grating-air interface and diffraction grating-substrate interface, leading to large Fresnel reflection, and thus, in a wavelength having the maximum reflection diffraction efficiency for TM polarized light, the lowering of the transmission diffraction efficiency for TE polarized light is considerably large, which therefore causes the filter not to function sufficiently as a polarizer. In order for a polarizer to function sufficiently, it is preferable that, in a predetermined wavelength region, the reflection diffraction efficiency for TE polarized light is close to 100%, and at the same time the transmission diffraction efficiency for TM polarized light is close to 100%.

Techniques of reducing Fresnel reflection generated in each of the diffraction grating-air interface and the diffraction grating-substrate interface as described above are disclosed (refer to, e.g., Patent Literature (hereinafter, abbreviated as "PTL") 1). PTL 1 discloses a wavelength filter including a substrate having fine irregularities, and a dielectric layer that covers the fine irregularities. In the wavelength filter disclosed in PTL 1, the fine irregularities are sized so as not to cause higher-order diffraction light for the reduction of the Fresnel reflection, and the cross-section of the fine irregularities is shaped to be triangle, to thereby gradually change the average refractive indexes for the dielectric layer and the air.

CITATION LIST

Patent Literature

PTL 1
Japanese Patent Application Laid-Open No. 2002-258034

Non Patent Literature

NPL 1: L. Mashev, and E. Popov, "Zero order anomaly of dielectric coated gratings", Optics Communications, Vol. 55, No. 6, pp. 377-380.
NPL 2: S. S. Wang and R. Magusson, "Theory and applications of guided-mode resonance filters", Applied Optics, Vol. 32, No. 14, pp. 2606-2613.

SUMMARY OF INVENTION

Technical Problem

In the guided-mode resonance filters disclosed in NPLs 1 and 2 and PTL 1, due to the presence of a substrate, the reduction in weight and thickness cannot be achieved. Further, the guided-mode resonance filters have large refractive index difference between the layers, which thus cause a problem of increased Fresnel reflection.

With that, an object of the present invention is to provide a polarizer having a diffraction grating, the polarizer reducing Fresnel reflection and exhibiting high reflection diffraction efficiency for TE polarized light as well as high transmission diffraction efficiency for TM polarized light, and an optical element having the polarizer.

Solution to Problem

In order to achieve the above-mentioned object, a polarizer according to the present invention includes a thin film with a constant thickness composed of a dielectric, and a plurality of slit-shaped through-holes each having the same width formed in the thin film and extending in a first direction, in which the plurality of through-holes are arranged on a surface of the thin film at a constant interval in a second direction perpendicular to the first direction.

Further, in order to achieve the above-mentioned object, an optical element according to the present invention includes the polarizer according to the present invention, and a holder that holds the polarizer so as not to close the plurality of through-holes.

Advantageous Effects of Invention

According to the present invention, it is possible to provide a lightweight and thin polarizer excellent in polarization separation characteristics, and an optical element having the polarizer.

DESCRIPTION OF EMBODIMENTS

Hereinafter, embodiments of the present invention will be described in detail with reference to the accompanying drawings.

[Configurations of Polarizer]

Figure 3:
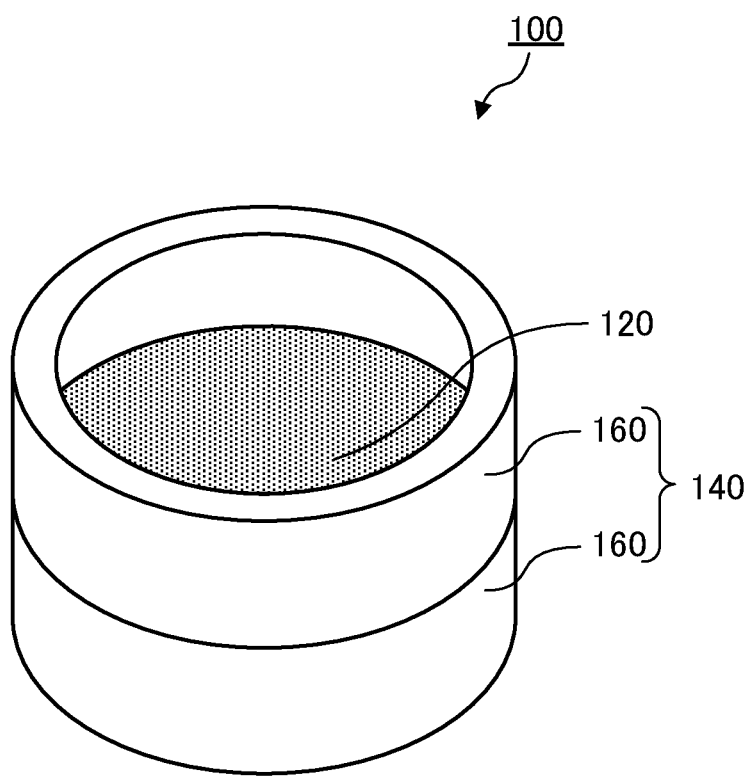
FIG. 3 is a perspective view illustrating an optical element according to an embodiment of the present invention.
Figure 4A:
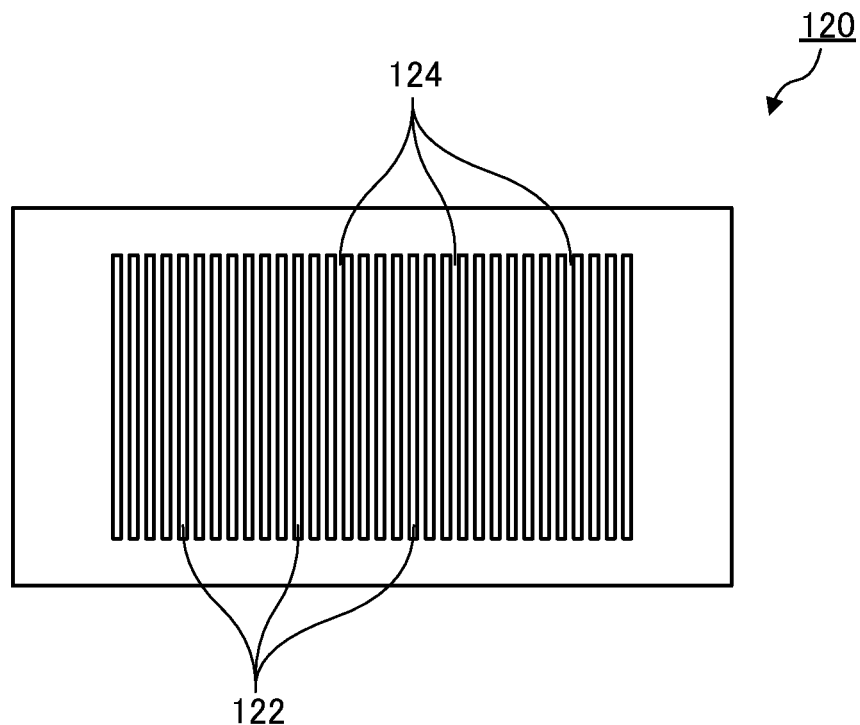
FIGS. 4A and 4B illustrate a configuration of a polarizer.
Figure 4B:
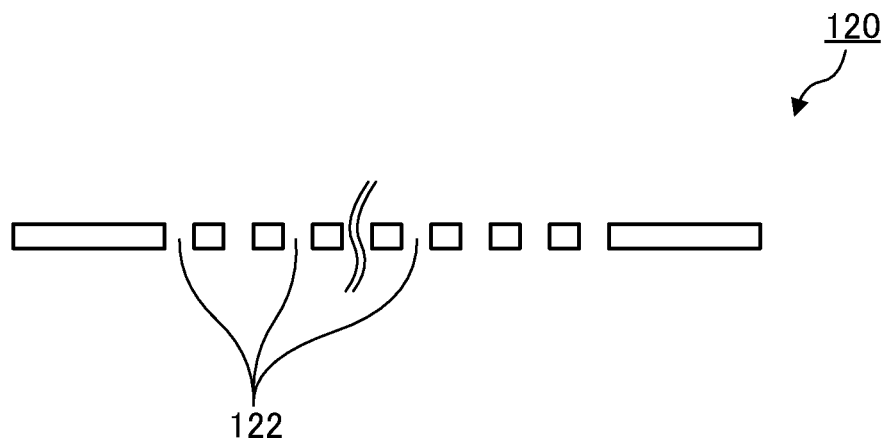

FIG. 3 is a perspective view illustrating the configuration of optical element 100 according to an embodiment of the present invention. FIGS. 4A and 4B illustrate the configuration of polarizer 120. As illustrated in FIGS. 3, 4A, and 4B, optical element 100 according to the present embodiment has polarizer 120 and holder 140.

Polarizer 120 is a thin film in which a plurality of slit-shaped through-holes 122 are provided. The plurality of through-holes 122 extend in a first direction. The length of each through-hole 122 in the first direction is not particularly limited. In the present embodiment, the respective through-holes 122 in the first direction have the same length. The plurality of through-holes 122 open to the first face (front face) and to the second face (rear face) which is in front-rear relationship with the first face. The plurality of through-holes 122 are arranged at a constant interval in the second direction perpendicular to the first direction. The plurality of through-holes 122 and a thin film (substantial part 124) located between adjacent through-holes 122 function as a diffraction grating. It is noted that substantial part 124 corresponds to "high refractive index part" in each simulation described later, and through-hole 122 corresponds to "low refractive index part."

The center-to-center distance (pitch Λ) of the plurality of through-holes 122 is preferably shorter than light wavelength λ to be irradiated. By making the pitch Λ of through-holes 122 shorter than light wavelength λ to be irradiated, it becomes possible to allow only 0-order diffraction light to be present. In the present embodiment, the pitch Λ of through-holes 122 in polarizer 120 used for light with a wavelength λ of 650 nm is preferably within a range of from 580 to 600 nm. Further, the pitch Λ of through-holes 122 in polarizer 120 used for light with a wavelength λ of 530 nm is preferably within a range of from 470 to 490 nm. The length (width) of through-holes 122 in the second direction can be calculated using filling factor f to be described below. Further, in polarizer 120 used for light with a wavelength λ of 650 nm and the polarizer used for light with a wavelength λ of 530 nm, the filling factor (percentage of substantial part 124 between through-holes 122 to the center-to-center distance Λ of through-holes 122) f is preferably within a range of from 0.25 to 0.35 or from 0.45 to 0.55. When the filling factor f is not within such a range, there is a concern that the transmittance of TM polarized light may be lowered, or the bandwidth of the reflectance of TE polarized light may be lowered.

The material for polarizer 120 is a dielectric, and is not particularly limited as long as the function described later can be secured. Examples of the material for polarizer 120 include resins such as polymethyl methacrylate (PMMA) and cycloolefin resin, and glass such as $SiO_2$, $Al_2O_3$ and quartz glass. Further, the refractive index n of polarizer 120 is not particularly limited as long as the function of polarizer 120 can be secured. The optimum refractive index n of polarizer 120 varies depending on light wavelength λ to be irradiated, the pitch Λ of through-holes 122, and the like. For example, when light wavelength λ to be irradiated is 650 nm, and the pitch Λ of through-holes 122 is 600 nm, the refractive index n of polarizer 120 is preferably within a range of from 1.44 to 1.53 or 1.57 or more, and more preferably within a range of from 1.57 to 1.60. When light wavelength λ to be irradiated is 650 nm, and the pitch Λ of through-holes 122 is 590 nm, the refractive index n of polarizer 120 is preferably within a range of from 1.51 to 2.08. When light wavelength λ to be irradiated is 650 nm, and the pitch Λ of through-holes 122 is 580 nm, the refractive index n of polarizer 120 is preferably within a range of from 1.60 to 2.10. When light wavelength λ to be irradiated is 530 nm, and the pitch Λ of through-holes 122 is 489 nm, the refractive index n of polarizer 120 is preferably within a range of from 1.46 to 1.54 or from 1.56 to 1.59. When light wavelength λ to be irradiated is 530 nm, and the pitch Λ of through-holes 122 is 481 nm, the refractive index n of polarizer 120 is preferably 1.53 or more, and more preferably within a range of from 1.53 to 2.11. When light wavelength λ to be irradiated is 530 nm, and the pitch Λ of through-holes 122 is 472 nm, the refractive index n of polarizer 120 is preferably within a range of from 1.63 to 2.07.

The method for adjusting the refractive index n of polarizer 120 made of resin is not particularly limited. For example, as disclosed in Japanese Patent Application Laid-Open No. 2007-270097 and No. 2000-327836, the refractive index n of polarizer 120 made of resin can be adjusted by dispersing microparticles of a metal oxide having high refractive index in the resin, such that the refractive index n of a resin medium reaches a region of high refractive index. Further, the method for adjusting the refractive index n of polarizer 120 made of glass is not particularly limited, either. For example, the refractive index n of polarizer 120 made of glass can be adjusted by concurrent coating (vapor deposition) of different materials such as $SiO_2$, $TiO_2$, and $Al_2O_3$ in a method of producing polarizer 120 to be described later.

The film thickness of polarizer 120 (depth of through-hole 122) is constant. The film thickness of polarizer 120 (depth of through-hole 122) is not particularly limited as long as the function of polarizer 120 can be secured. The film thickness of polarizer 120 (depth of through-hole 122) is preferably within a range of from 170 to 195 or from 235 to 410 nm. It is noted that the optimum film thickness of polarizer 120 (depth of through-hole 122) varies depending on light wavelength λ to be irradiated to polarizer 120 and the refractive index n of polarizer 120.

Next, the limitation to the pitch Λ of through-holes 122 will be described. When the incident angle of light to be irradiated to a diffraction grating is defined as θi, diffraction angle as θm, the pitch of through-holes 122 as Λ, light wavelength as λ, diffraction order number as m, and the average refractive index of polarizer 120 as n, the following Expression (1) holds true:

$$n \cdot \sin \theta m = \sin \theta i + m(\lambda/\Lambda) \quad (1)$$

Here, for simplification, the incident angle θi is set at 0 (θi=0), and the diffraction order number m is set at 1 (m=1), the Expression (1) is equal to the following Expression (2):

$$\sin \theta m = (\lambda/n \cdot \Lambda) \quad (2)$$

Here, in order for primary diffraction light to be present in the diffraction grating, the right-hand side relative to sin θm needs to satisfy the following Expression (3):

$$\lambda/n \leq \Lambda \quad (3)$$

It is noted that the average refractive index n of polarizer 120 differs between a value for TE polarized light and a value for TM polarized light. The average refractive index n of polarizer 120 varies depending on diffraction grating filling factor f. Here, in the case where media having two different refractive indexes $n_1$ and $n_2$ are arranged alternately at a constant pitch, when the pitch Λ of through-holes 122 is sufficiently small relative to light wavelength λ, the average refractive index in TE polarized light ($n_{TE}$) and the average refractive index in TM polarized light ($n_{TM}$) can be represented, based on effective-medium theory (effective medium approximation), as the following Expressions (4) and (5):

$$n_{TE} = \{(1-f) \cdot n_1^2 + f n_2^2\}^{1/2} \quad (4)$$

$$n_{TM} = 1/\{(1-f)/n_1^2 + f/n_2^2\}^{1/2} \quad (5)$$

As described above, polarizer 120 according to the present embodiment has poor strength since it is a thin film composed of a dielectric, and is difficult to be handled. With that, in optical element 100 according to the present embodiment, polarizer 120 is held by holder 140 to thereby enable polarizer 120 to be handled easily. Holder 140 holds polarizer 120. The configuration of holder 140 is not particularly limited as long as holder 140 can hold polarizer 120 so as not to close the plurality of through-holes 122. In the present embodiment, holder 140 is composed of a pair of separate holders 160. Holder 140 holds polarizer 120 so as to interpose polarizer 120 between holders on the front face side and the rear face side.

The material for holder 140 is not particularly limited as long as holder 140 can hold polarizer 120. Examples of the material for holder 140 include ceramic and resin.

[Method of Producing Polarizer]

The method of producing polarizer 120 according to the present embodiment is not particularly limited. Polarizer 120 according to the present embodiment can be produced, for example, according to the following method: a metal film made of Cr or the like is formed on a substrate made of Si, and a thin film of $SiO_2$ is coated onto the metal film to have a thickness of about several hundreds of nm by vacuum vapor deposition or the like. Subsequently, a resist for EB drawing is applied with a spinner, and, for example, a line pattern with a width of about 300 nm is drawn using an electron beam drawing device. Then, development is performed to remove the pattern of the drawn part. Next, the resist pattern is masked, and the $SiO_2$ thin film part is completely etched and penetrated using a dry etching device and using an etching gas of $CF_4$ or $C_4F_8$. Finally, using a liquid mixture of perchloric acid and cerium ammonium nitrate dissolving metal Cr, the base Cr thin film can be peeled off to thereby form a plurality of through-holes 122 in the $SiO_2$ thin film (lift-off method). According to the above-mentioned process, polarizer 120 can be produced.

[Simulation]

Next, simulations were performed for transmission diffraction characteristics and reflection diffraction characteristics in the cases where TE polarized light and TM polarized light were irradiated to polarizer 120 having through-holes 122 with pitch Λ (diffraction grating). In Simulations 1 to 3, unless otherwise specified, pitch Λ of through-holes 122 was set at 600 nm, the width of a high refractive index part (a part of the thin film between through-holes 122) at 300 nm, the width of a low refractive index part (through-hole 122) at 300 nm, and refractive index of the low refractive index part ($n_L$) at 1.0. Further, light wavelength λ to be used was set at 650 nm which is a wavelength of red visible light. The transmission characteristics and reflection characteristics of the diffraction grating having such predetermined structures can be calculated using Rigorous Coupled-Wave Analysis (RCWA) Method or Finite Difference Time Domain (FDTD) Method. It is noted that the following simulations were performed by RCWA method. Further, in each simulation, dielectric constant was determined using RCWA method by taking in up to 20 terms in Fourier-expanded series terms. In each simulation, with the combination of refractive index n and pitch Λ of through-holes 122 or wavelength λ, only 0-order diffraction light is present for the refraction light of transmission light and reflection light.

(Simulation 1)

Figure 5A:
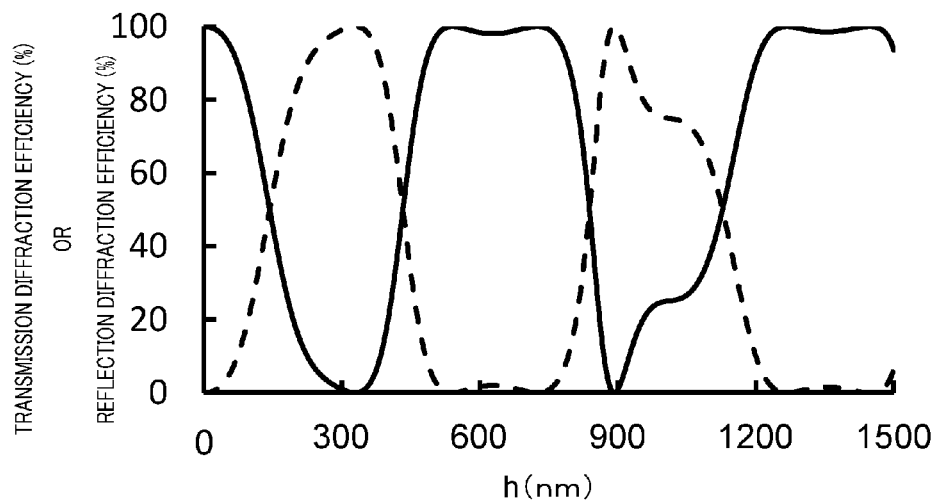
FIG. 5A is a graph showing the correlation between through-hole depth and transmission diffraction efficiency or reflection diffraction efficiency for TE polarized light.
Figure 5B:
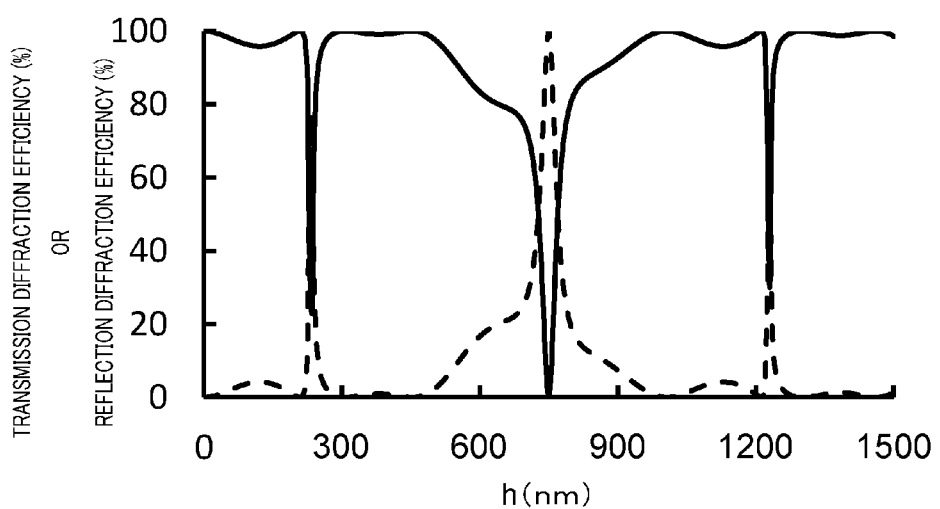
FIG. 5B is a graph showing the correlation between through-hole depth and transmission diffraction efficiency or reflection diffraction efficiency for TM polarized light, when the refractive index of high refractive index part ($n_H$) is set at 1.50.

First, in Simulation 1, when the refractive index of a high refractive index part ($n_H$) was set at 1.50, the correlations between the depth h of through-hole 122, and the diffraction efficiency for TE polarized light and the diffraction efficiency for TM polarized light were simulated. FIG. 5A is a graph showing the correlations between the depth h of through-hole 122, and the transmission diffraction efficiency and reflection diffraction efficiency for TE polarized light, and FIG. 5B is a graph showing the correlations between the depth h of through-hole 122, and the transmission diffraction efficiency and reflection diffraction efficiency for TM polarized light. The abscissa in FIGS. 5A and 5B indicates the depth h (nm) of through-hole 122. In addition, the ordinate in FIGS. 5A and 5B indicates transmission diffraction efficiency (%) or reflection diffraction efficiency (%). The solid line in FIG. 5A indicates the transmission diffraction efficiency for TE polarized light, and the broken line indicates the reflection diffraction efficiency for TE polarized light. Further, the solid line in FIG. 5B indicates the transmission diffraction efficiency for TM polarized light, and the broken line indicates the reflection diffraction efficiency for TM polarized light.

As illustrated in FIGS. 5A and 5B, the reflection diffraction efficiency for TE polarized light was maximum when the depth h of through-hole 122 was 330 nm. This indicates a state where primary diffraction light of a diffraction grating and $TE_0$ mode which is a 0-order guided mode as a waveguide are coupled. Further, the reflection diffraction efficiency for TE polarized light significantly falls at about 600 nm of the depth h of through-hole 122. This means that increasing the depth h of through-hole 122 causes the diffraction light not to couple with the propagation mode of the waveguide. Further, the reflection diffraction efficiency for TE polarized light indicated about 100% at about 900 nm of the depth h of through-hole 122. This means that the diffraction light couples with $TE_1$ which is the propagation mode of the waveguide. Thus, at 330 nm of the depth h of through-hole 122 at which the reflection diffraction efficiency for TE polarized light was the highest, the reflection diffraction efficiency for TE polarized light was 99.9%, and the transmission diffraction efficiency for TM polarized light was 99.76%. From the above, it was found that the depth h of through-hole 122 is preferably 330 nm, when the refractive index of the high refractive index part ($n_H$) is set at 1.50, the refractive index of the low refractive index part ($n_L$) at 1.0, and the pitch Λ of through-holes 122 at 600 nm, in order for the reflection diffraction efficiency for TE polarized light to be close to 100% and for the transmission diffraction efficiency for TM polarized light to be close to 100%.

Figure 6A:
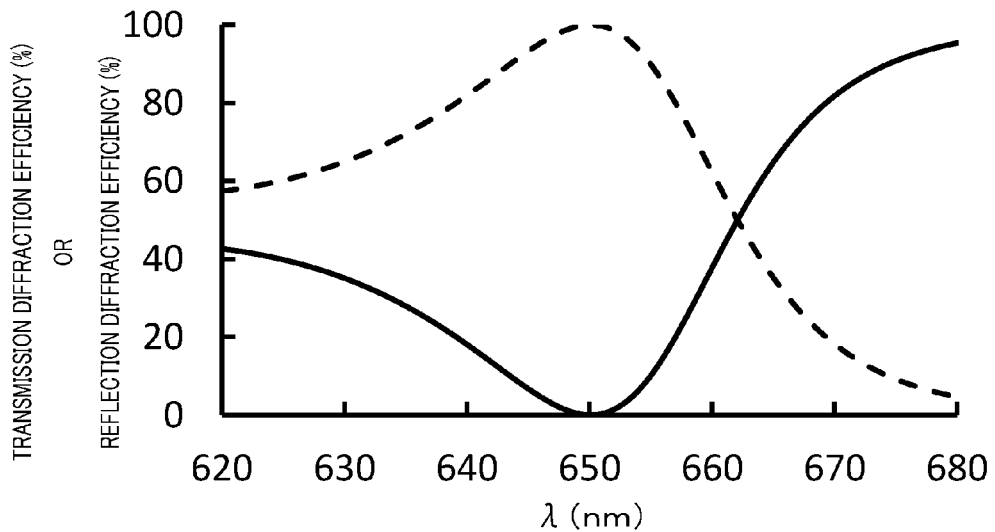
FIG. 6A is a graph showing the correlation between a light wavelength and transmission diffraction efficiency or reflection diffraction efficiency for TE polarized light.
Figure 6B:
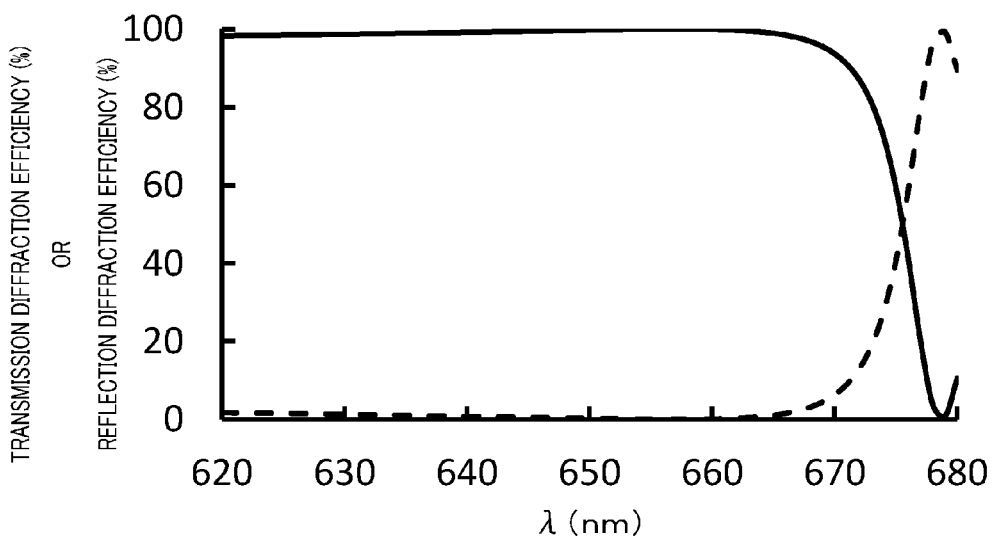
FIG. 6B is a graph showing the correlation between a light wavelength and transmission diffraction efficiency or reflection diffraction efficiency for TM polarized light, when the refractive index of high refractive index part ($n_H$) is set at 1.50, and through-hole depth h is set at 330 nm.

Next, when the depth h of through-hole 122 was 330 nm at which the reflection diffraction efficiency for TE polarized light was maximum, the diffraction efficiency for TE polarized light and the diffraction efficiency for TM polarized light in a range of a light wavelength λ of from 620 to 680 nm were simulated. FIG. 6A is a graph showing the correlations between light wavelength λ, and the transmission diffraction efficiency and reflection diffraction efficiency for TE polarized light. FIG. 6B is a graph showing the correlations between light wavelength λ, and the transmission diffraction efficiency and reflection diffraction efficiency for TM polarized light. The abscissa in FIGS. 6A and 6B indicates light wavelength λ (nm). In addition, the ordinate in FIGS. 6A and 6B indicates transmission diffraction efficiency (%) or reflection diffraction efficiency (%) for TM polarized light. The solid line in FIG. 6A indicates transmission diffraction efficiency (%) for TE polarized light, and the broken line indicates reflection diffraction efficiency (%) for TE polarized light. Further, the solid line in FIG. 6B indicates the transmission diffraction efficiency for TM polarized light, and the broken line indicates the reflection diffraction efficiency for TM polarized light.

As shown in FIG. 6B, the transmission diffraction efficiency for TM polarized light was about 100% in a wide band range of 620 to 660 nm. This indicates transmission characteristics closer to those of the short wave path filter. Further, in a long wavelength region of 670 nm or more, the transmission diffraction efficiency for TM polarized light was lowered. The reflection diffraction efficiency for TE polarized light was about 100% at a light wavelength λ of 650 nm (refer to FIG. 6A). These results mean that polarizer 120 according to the present embodiment causes almost no Fresnel reflection, despite the fact that polarizer 120 has a simple structure only composed of a single-layered diffraction grating.

Figure 7:
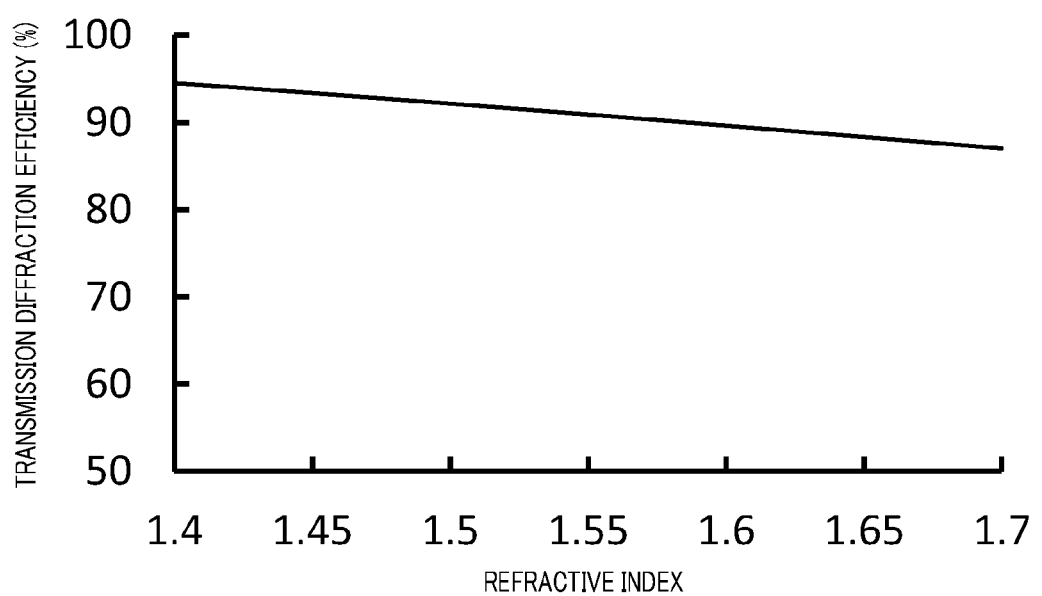
FIG. 7 is a graph showing the loss of light due to Fresnel reflection when light is transmitted through two faces.

Next, for comparison, the influence of Fresnel reflection was simulated at the time when light passes through a cuboid test piece composed of a dielectric having a refractive index of the high refractive index part ($n_H$) within a range of from 1.40 to 1.70 from the front face side to the rear face side. FIG. 7 is a graph showing the loss of light due to Fresnel reflection when light is transmitted through two faces. The loss due to Fresnel reflection at one face (front face or rear face) can be determined by $\{(1-n)/(1+n)\}^2$. Further, the transmission diffraction efficiency can be determined by $1-\{(1-n)/(1+n)\}^2$. It is noted that etalon effect due to multiple interference between two faces is not taken into consideration. The abscissa in FIG. 7 indicates refractive index n of the test piece, and the ordinate indicates transmission diffraction efficiency in the test piece.

It has been found, as shown in FIG. 7, that as the refractive index n of the test piece is increased, Fresnel reflection is increased. Specifically, when the refractive index n of the test piece was 1.4, the transmission diffraction efficiency of the light was 94.52%, whereas when the refractive index n of the test piece was 1.7, the transmission diffraction efficiency of the light was decreased to 87%. From these results, it can be found that polarizer 120 according to the present embodiment achieves significant reduction in Fresnel reflection compared to the test piece for comparison, in spite of the simple structure of polarizer 120.

(Simulation 2)

Figure 8A:
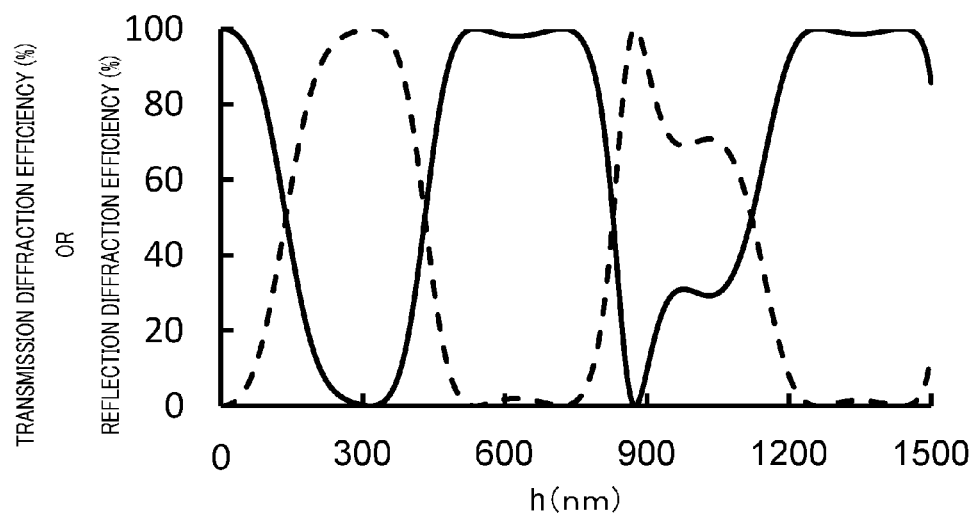
FIG. 8A is a graph showing the correlation between through-hole depth and transmission diffraction efficiency or reflection diffraction efficiency for TE polarized light.
Figure 8B:
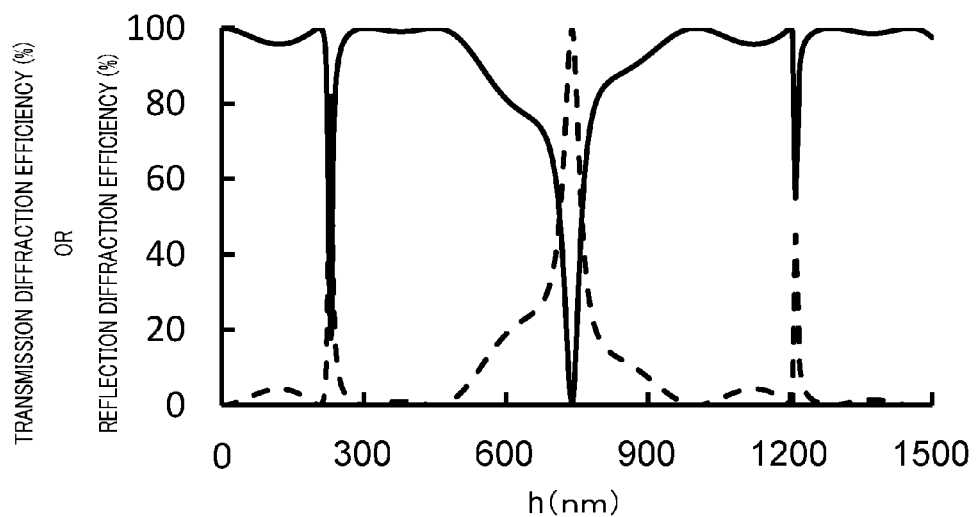
FIG. 8B is a graph showing the correlation between through-hole depth and transmission diffraction efficiency or reflection diffraction efficiency for TM polarized light, when the refractive index of high refractive index part ($n_H$) is set at 1.51.

Next, a simulation similar to Simulation 1 was performed, with the refractive index of a high refractive index part ($n_H$) being set at 1.51, in order to study the influence of the refractive index of the high refractive index part ($n_H$). First, in Simulation 2, when the refractive index of the high refractive index part ($n_H$) was set at 1.51, the correlations between the depth h of through-hole 122, and the diffraction efficiency for TE polarized light and the diffraction efficiency for TM polarized light were simulated. FIG. 8A is a graph showing the correlations between the depth h of through-hole 122, and the transmission diffraction efficiency and reflection diffraction efficiency for TE polarized light. FIG. 8B is a graph showing the correlations between the depth h of through-hole 122, and the transmission diffraction efficiency and reflection diffraction efficiency for TM polarized light. The abscissa in FIGS. 8A and 8B indicates the depth h (nm) of through-hole 122. In addition, the ordinate in FIGS. 8A and 8B indicates transmission diffraction efficiency (%) or reflection diffraction efficiency (%). The solid line in FIG. 8A indicates the transmission diffraction efficiency for TE polarized light, and the broken line indicates the reflection diffraction efficiency for TE polarized light. Further, the solid line in FIG. 8B indicates the transmission diffraction efficiency for TM polarized light, and the broken line indicates the reflection diffraction efficiency for TM polarized light.

As illustrated in FIGS. 8A and 8B, the reflection diffraction efficiency for TE polarized light was maximum when the depth h of through-hole 122 was 310 nm.

Figure 9A:
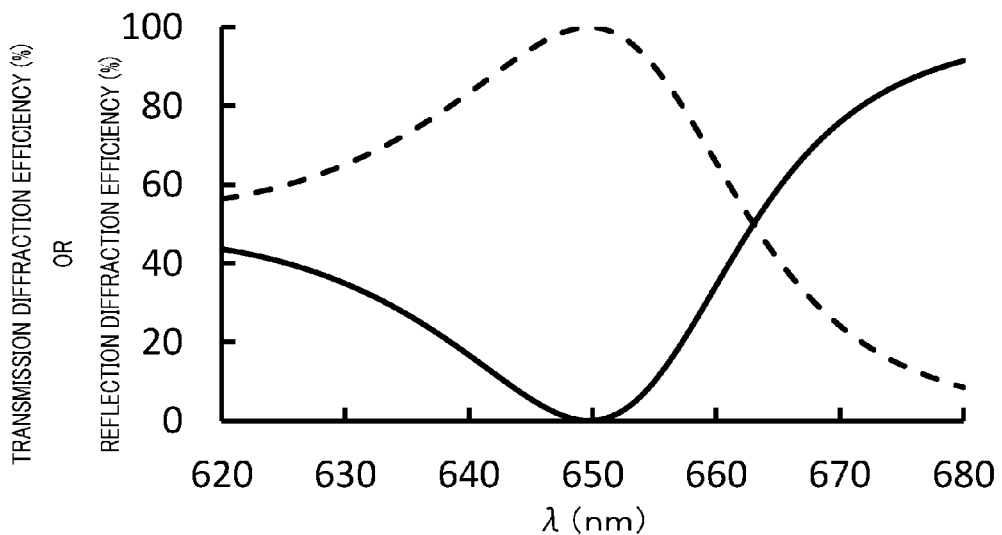
FIG. 9A is a graph showing the correlation between a light wavelength and transmission diffraction efficiency or reflection diffraction efficiency for TE polarized light.
Figure 9B:
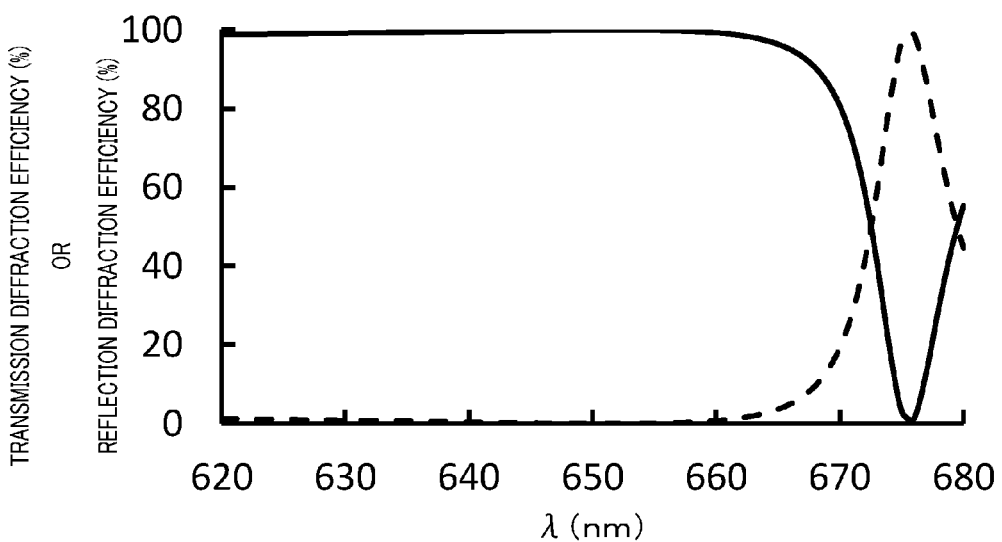
FIG. 9B is a graph showing the correlation between a light wavelength and transmission diffraction efficiency or reflection diffraction efficiency for TM polarized light, when the refractive index of high refractive index part ($n_H$) is set at 1.51, and through-hole depth h is set at 310 nm.

Next, when the depth h of through-hole 122 was 310 nm at which the reflection diffraction efficiency for TE polarized light was maximum, the diffraction efficiency for TE polarized light and the diffraction efficiency for TM polarized light in a range of a light wavelength λ of from 620 to 680 nm were simulated. FIG. 9A is a graph showing the correlations between light wavelength λ, and the transmission diffraction efficiency and reflection diffraction efficiency for TE polarized light. FIG. 9B is a graph showing the correlations between light wavelength λ, and the transmission diffraction efficiency and reflection diffraction efficiency for TM polarized light. The abscissa in FIGS. 9A and 9B indicates light wavelength λ (nm). In addition, the ordinate in FIGS. 9A and 9B indicates transmission diffraction efficiency (%) or reflection diffraction efficiency (%). The solid line in FIG. 9A indicates the transmission diffraction efficiency for TE polarized light, and the broken line indicates the reflection diffraction efficiency for TE polarized light.

Further, the solid line in FIG. 9B indicates the transmission diffraction efficiency for TM polarized light, and the broken line indicates the reflection diffraction efficiency for TM polarized light.

As shown in FIGS. 9A and 9B, when the light wavelength λ was 650 nm, the reflection diffraction efficiency for TE polarized light was about 100%, and the transmission diffraction efficiency for TM polarized light was about 100%. As shown in FIGS. 5A and 5B, 6A and 6B, 8A and 8B, and 9A and 9B, it was found that, when the refractive index of the high refractive index part ($n_H$) was changed, the depth h of through-hole 122 at which the reflection diffraction efficiency for TE polarized light was maximum in the case of a light wavelength λ of 650 nm was also changed. Further, it was also found that, as the refractive index n was increased from 1.50, a wavelength corresponding to the edge of the transmission diffraction efficiency spectrum for TM polarized light was shifted to a short wavelength side.

In the following Simulations 3 to 8, the influence was studied, of the change of the refractive index of a high refractive index part ($n_H$) and the depth of through-hole 122 on the transmission diffraction efficiency and reflection diffraction efficiency for TE polarized light and the transmission diffraction efficiency and reflection diffraction efficiency for TM polarized light.

(Simulation 3)

Figure 10A:
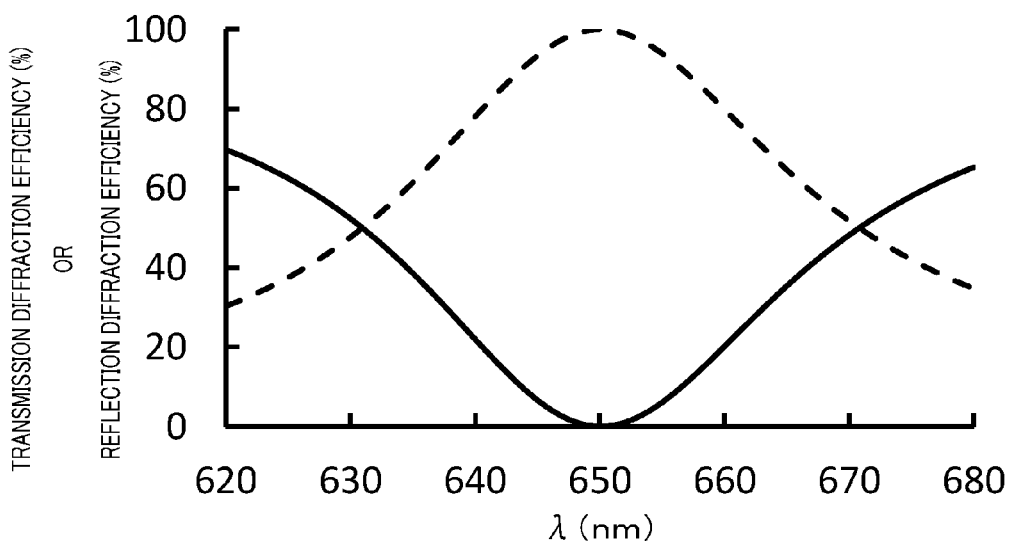
FIG. 10A is a graph showing the correlation between a light wavelength and transmission diffraction efficiency or reflection diffraction efficiency for TE polarized light.
Figure 10B:
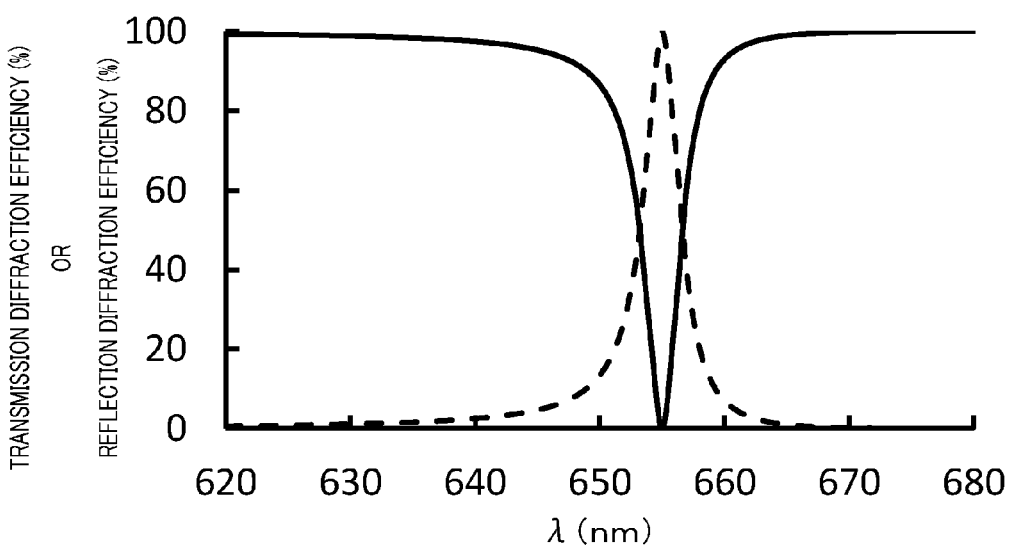
FIG. 10B is a graph showing the correlation between a light wavelength and transmission diffraction efficiency or reflection diffraction efficiency for TM polarized light, when the refractive index of high refractive index part ($n_H$) is set at 1.55, and through-hole depth h is set at 255 nm.

In Simulation 3, when the refractive index of a high refractive index part ($n_H$) was set at 1.55 and the depth h of through-hole 122 was set at 255 nm, the diffraction efficiency for TE polarized light and the diffraction efficiency for TM polarized light were simulated. FIG. 10A is a graph showing the correlations between light wavelength λ and transmission diffraction efficiency and reflection diffraction efficiency. FIG. 10B is a graph showing the correlations between light wavelength λ and transmission diffraction efficiency and reflection diffraction efficiency. The abscissa in FIGS. 10A and 10B indicates light wavelength λ (nm). In addition, the ordinate in FIGS. 10A and 10B indicates transmission diffraction efficiency (%) or reflection diffraction efficiency (%). The solid line in FIG. 10A indicates the transmission diffraction efficiency for TE polarized light, and the broken line indicates the reflection diffraction efficiency for TE polarized light. Further, the solid line in FIG. 10B indicates the transmission diffraction efficiency for TM polarized light, and the broken line indicates the reflection diffraction efficiency for TM polarized light.

As shown in FIGS. 10A and 10B, when light wavelength λ was 650 nm, the transmission diffraction efficiency for TM polarized light was maintained at about 80%. Thus, it was found that polarizer 120 in which the refractive index of the high refractive index part ($n_H$) was 1.55 and the depth h of through-hole 122 was 255 nm was able to perform the function of a polarizer properly enough.

(Simulation 4)

Figure 11A:
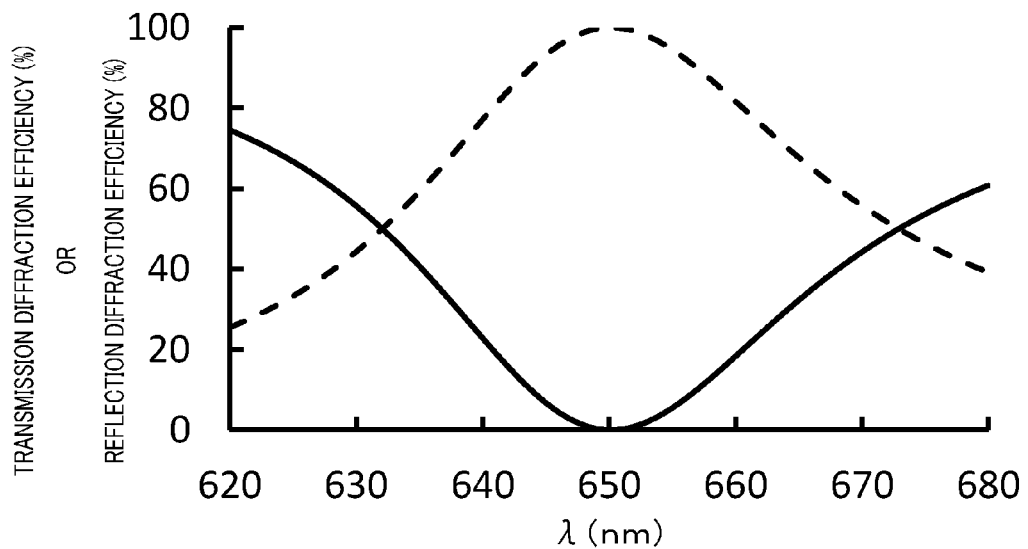
FIG. 11A is a graph showing the correlation between a light wavelength and transmission diffraction efficiency or reflection diffraction efficiency for TE polarized light.
Figure 11B:
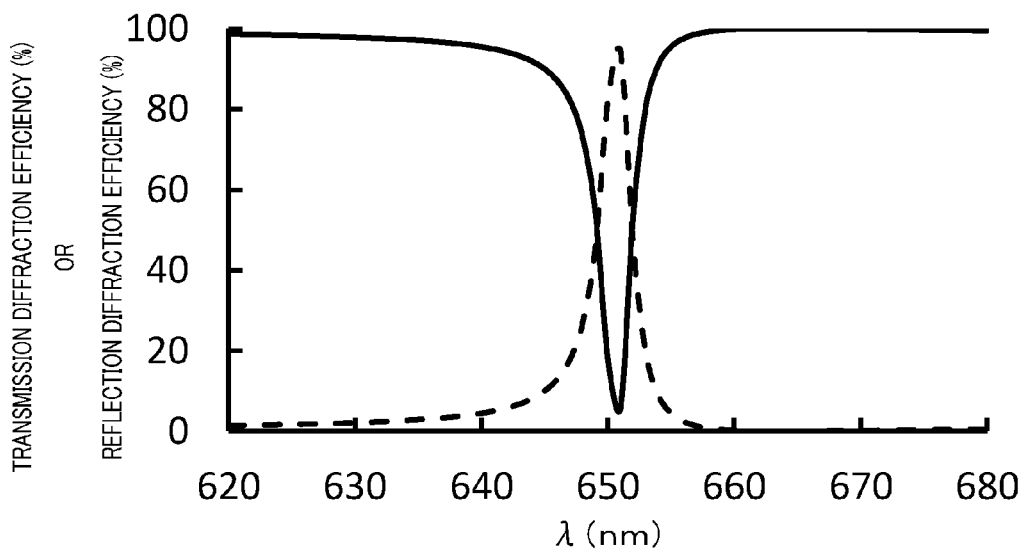
FIG. 11B is a graph showing the correlation between a light wavelength and transmission diffraction efficiency or reflection diffraction efficiency for TM polarized light, when the refractive index of high refractive index part ($n_H$) is set at 1.56, and through-hole depth h is set at 210 nm.

In Simulation 4, when the refractive index of a high refractive index part ($n_H$) was set at 1.56 and the depth h of through-hole 122 was set at 210 nm, the diffraction efficiency for TE polarized light and the diffraction efficiency for TM polarized light were simulated. FIG. 11A is a graph showing the correlations between light wavelength λ, and the transmission diffraction efficiency and reflection diffraction efficiency for TE polarized light. FIG. 11B is a graph showing the correlations between light wavelength λ, and the transmission diffraction efficiency and reflection diffraction efficiency for TM polarized light. The abscissa in FIGS. 11A and 11B indicates light wavelength λ (nm). In addition, the ordinate in FIGS. 11A and 11B indicates transmission diffraction efficiency (%) or reflection diffraction efficiency (%). The solid line in FIG. 11A indicates the transmission diffraction efficiency for TE polarized light, and the broken line indicates the reflection diffraction efficiency for TE polarized light. Further, the solid line in FIG. 11B indicates the transmission diffraction efficiency for TM polarized light, and the broken line indicates the reflection diffraction efficiency for TM polarized light.

As shown in FIGS. 11A and 11B, it was found that, when the refractive index of the high refractive index part ($n_H$) was 1.56, TM polarized light was not transmitted, with most of the light being reflected, and polarizer 120 did not function in this region. Thus, it was found that, as the refractive index of the high refractive index part ($n_H$) was gradually increased, a condition was established in which the diffraction light was coupled with the guided mode also in TM polarized light concurrently in TE polarized light.

(Simulation 5)

Figure 12A:
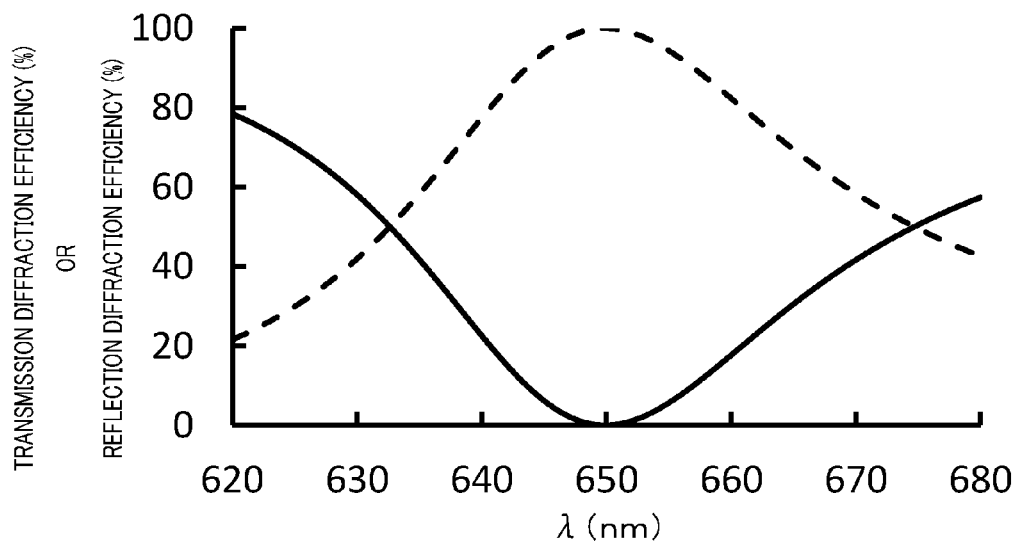
FIG. 12A is a graph showing the correlation between a light wavelength and transmission diffraction efficiency or reflection diffraction efficiency for TE polarized light.
Figure 12B:
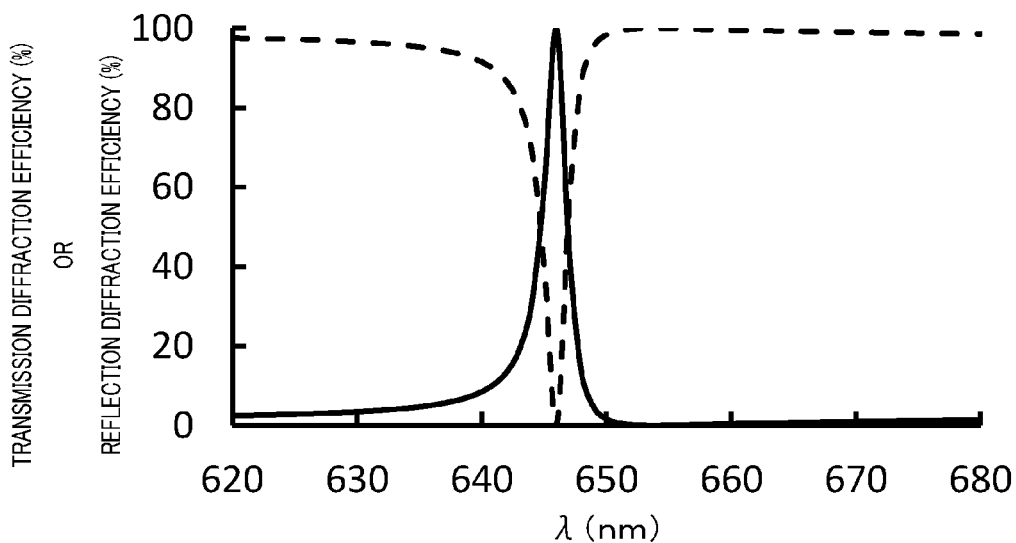
FIG. 12B is a graph showing the correlation between a light wavelength and transmission diffraction efficiency or reflection diffraction efficiency for TM polarized light, when the refractive index of high refractive index part ($n_H$) is set at 1.57, and through-hole depth h is set at 195 nm.

In Simulation 5, when the refractive index of a high refractive index part ($n_H$) was set at 1.57 and the depth h of through-hole 122 was set at 195 nm, the diffraction efficiency for TE polarized light and the diffraction efficiency for TM polarized light were simulated. FIG. 12A is a graph showing the correlations between light wavelength λ, and the transmission diffraction efficiency and reflection diffraction efficiency for TE polarized light. FIG. 12B is a graph showing the correlations between light wavelength λ, and the transmission diffraction efficiency and reflection diffraction efficiency for TM polarized light. The abscissa in FIGS. 12A and 12B indicates light wavelength λ (nm). In addition, the ordinate in FIGS. 12A and 12B indicates transmission diffraction efficiency (%) or reflection diffraction efficiency (%). The solid line in FIG. 12A indicates the transmission diffraction efficiency for TE polarized light, and the broken line indicates the reflection diffraction efficiency for TE polarized light. Further, the solid line in FIG. 12B indicates the transmission diffraction efficiency for TM polarized light, and the broken line indicates the reflection diffraction efficiency for TM polarized light.

As shown in FIGS. 12A and 12B, it was found that the shift of light wavelength λ to 650 nm or less allowed the transmission diffraction efficiency at a light wavelength λ of 650 nm to be increased again, thus enabling polarizer 120 to be used.

(Simulation 6)

Figure 13A:
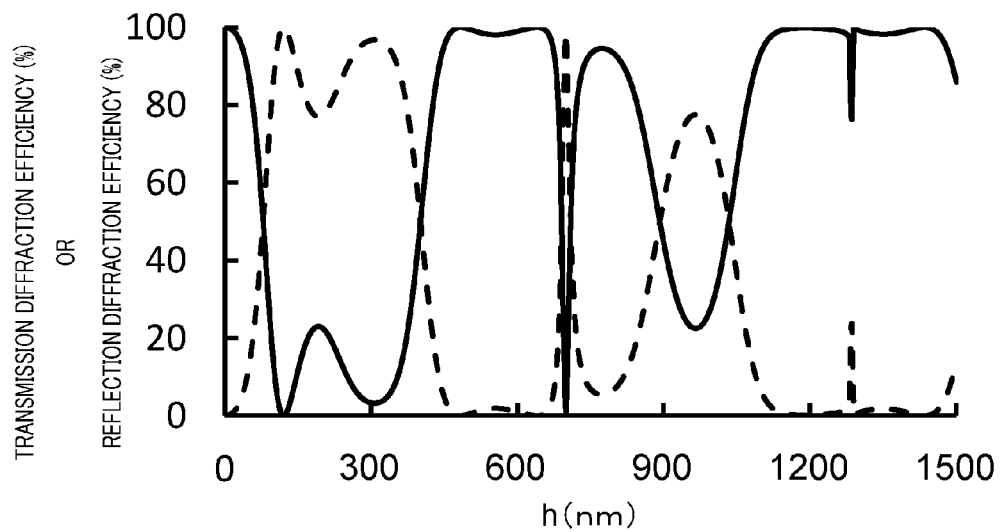
FIG. 13A is a graph showing the correlation between through-hole depth and transmission diffraction efficiency or reflection diffraction efficiency for TE polarized light.
Figure 13B:
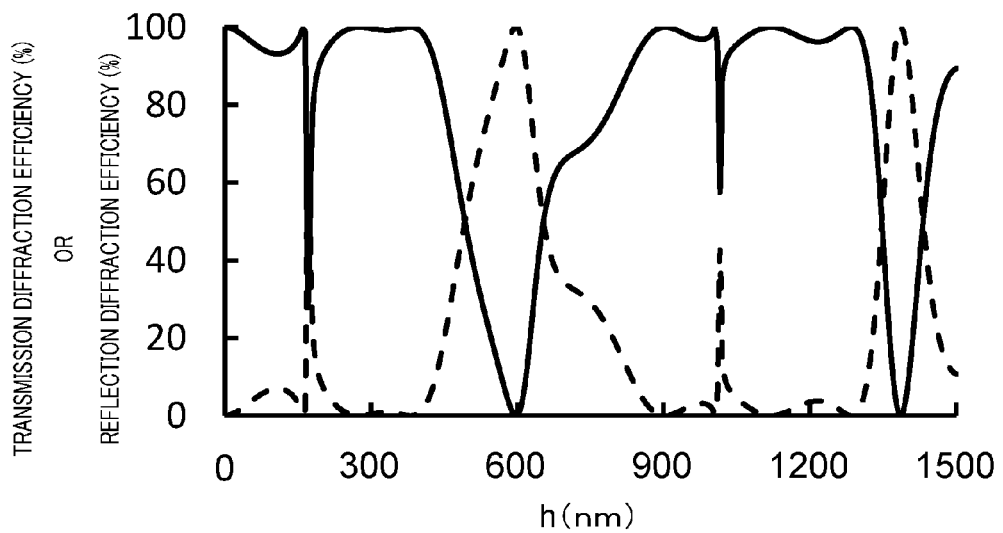
FIG. 13B is a graph showing the correlation between through-hole depth and transmission diffraction efficiency or reflection diffraction efficiency for TM polarized light, when the refractive index of high refractive index part ($n_H$) is set at 1.70.

Next, the influence was studied, of the increase of the refractive index of a high refractive index part ($n_H$) on the diffraction efficiency for TE polarized light and the diffraction efficiency for TM polarized light. In Simulation 6, when the refractive index of the high refractive index part ($n_H$) was set at 1.70, the correlations between the depth h of through-hole 122, and the diffraction efficiency for TE polarized light and the reflection diffraction efficiency for TM polarized light were simulated. FIG. 13A is a graph showing the correlations between the depth h of through-hole 122, and the transmission diffraction efficiency and reflection diffraction efficiency for TE polarized light. FIG. 13B is a graph showing the correlations between the depth h of through-hole 122, and the transmission diffraction efficiency and reflection diffraction efficiency for TM polarized light. The abscissa in FIGS. 13A and 13B indicates the depth h (nm) of through-hole 122. In addition, the ordinate in FIGS. 13A and 13B indicates transmission diffraction efficiency (%) or reflection diffraction efficiency (%). The solid line in FIG. 13A indicates the transmission diffraction efficiency for TE polarized light, and the broken line indicates the reflection diffraction efficiency for TE polarized light. Further, the solid line in FIG. 13B indicates the transmission diffraction efficiency for TM polarized light, and the broken line indicates the reflection diffraction efficiency for TM polarized light.

As shown in FIGS. 13A and 13B, the depth h of through-hole 122 at which the reflection diffraction efficiency for TE polarized light was maximum was 120 nm, whereas the transmission diffraction efficiency for TM polarized light was lowered by about 6 to 7%. Thus, it was found that, when the refractive index of the high refractive index part ($n_H$) was increased, the reflection diffraction efficiency for TE polarized light was hardly changed, whereas the transmission diffraction efficiency for TM polarized light was decreased.

(Simulation 7)

Figure 14A:
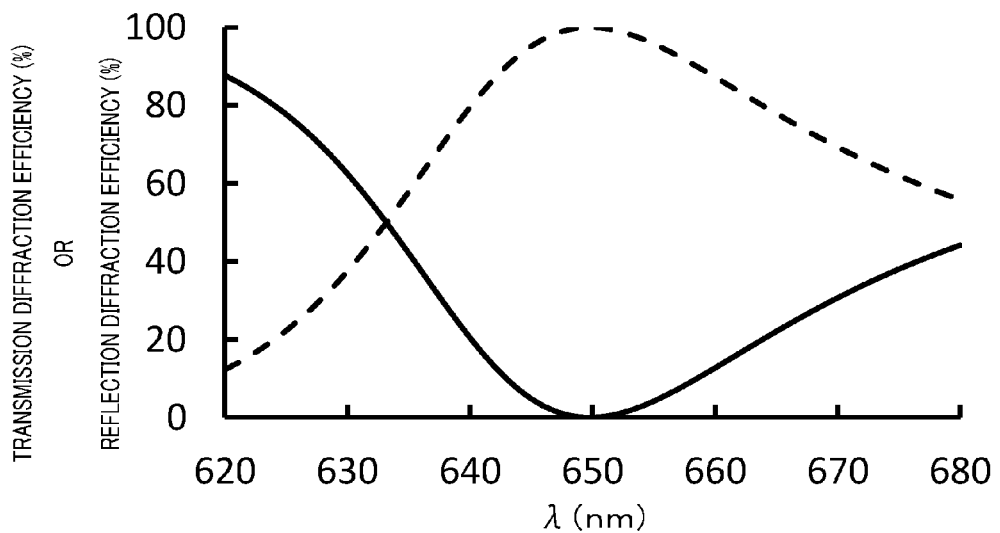
FIG. 14A is a graph showing the correlation between a light wavelength and transmission diffraction efficiency or reflection diffraction efficiency for TE polarized light.
Figure 14B:
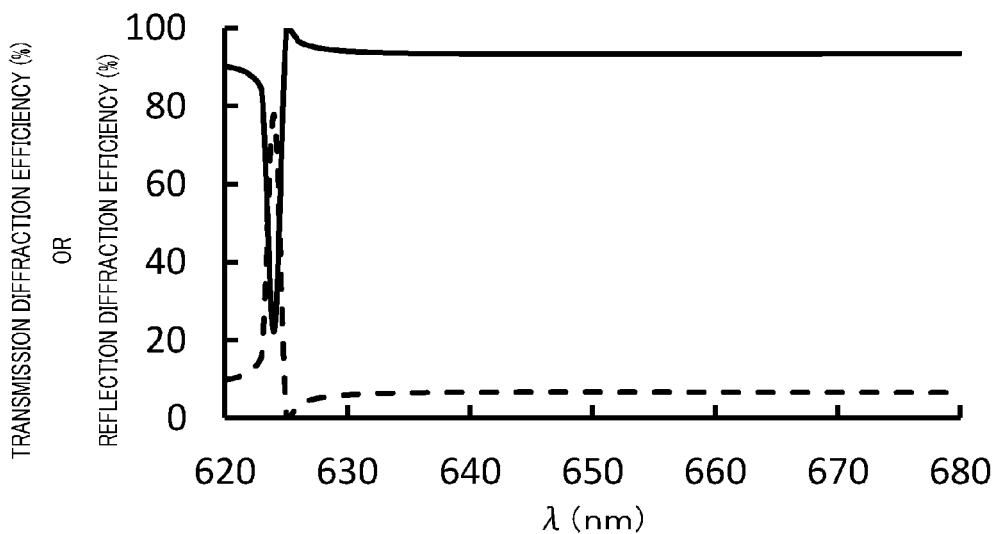
FIG. 14B is a graph showing the correlation between a light wavelength and transmission diffraction efficiency or reflection diffraction efficiency for TM polarized light, when the refractive index of high refractive index part ($n_H$) is set at 1.40, and through-hole depth h is set at 120 nm.

Next, the influence was studied, of the decrease of the refractive index of a high refractive index part ($n_H$) on the diffraction efficiency for TE polarized light and the diffraction efficiency for TM polarized light. In Simulation 7, when the refractive index of the high refractive index part ($n_H$) was set at 1.40 and the depth h of through-hole 122 was set at 120 nm, the diffraction efficiency for TE polarized light and the diffraction efficiency for TM polarized light were simulated. FIG. 14A is a graph showing the correlations between light wavelength λ, and the transmission diffraction efficiency and reflection diffraction efficiency for TE polarized light. FIG. 14B is a graph showing the correlations between light wavelength λ, and the transmission diffraction efficiency and reflection diffraction efficiency for TM polarized light. The abscissa in FIGS. 14A and 14B indicates light wavelength λ (nm). In addition, the ordinate in FIGS. 14A and 14B indicates transmission diffraction efficiency (%) or reflection diffraction efficiency (%). The solid line in FIG. 14A indicates the transmission diffraction efficiency for TE polarized light, and the broken line indicates the reflection diffraction efficiency for TE polarized light. Further, the solid line in FIG. 14B indicates the transmission diffraction efficiency for TM polarized light, and the broken line indicates the reflection diffraction efficiency for TM polarized light.

The cause for the lowering of the transmission diffraction efficiency for TM polarized light as shown in FIGS. 14A and 14B is considered to be as follows: as the refractive index of the high refractive index part ($n_H$) is increased, the average refractive index of polarizer 120 is increased, causing the absolute value of Fresnel reflection by the air layer to be further increased. On the other hand, when the refractive index of the high refractive index part ($n_H$) is decreased, the width of the reflection spectrum band in the reflection diffraction efficiency for TE polarized light was undesirably narrowed.

(Simulation 8)

Figure 15:
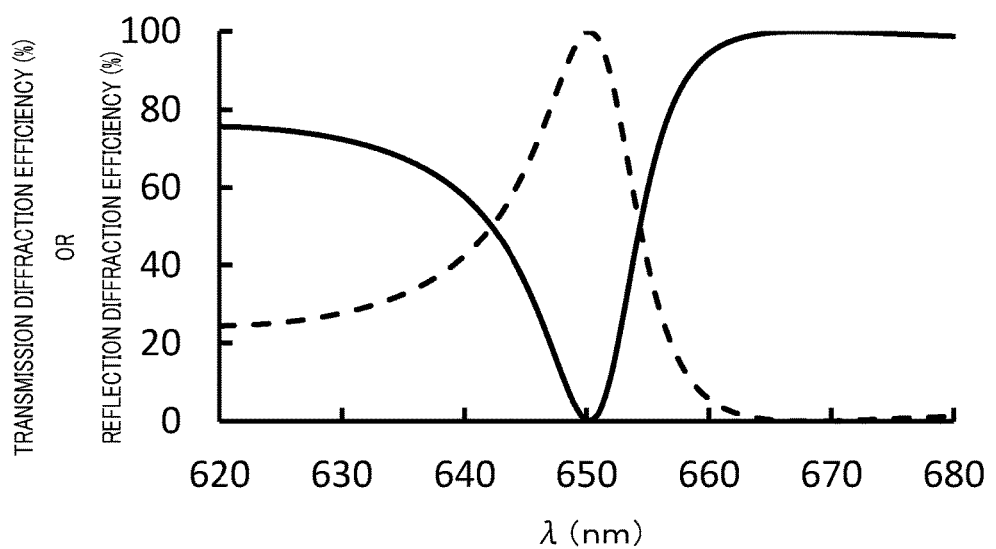
FIG. 15 is a graph showing the correlation between a light wavelength and diffraction efficiency for TE polarized light when the refractive index of high refractive index part ($n_H$) is set at 1.40, and through-hole depth h is set at 435 nm.

In Simulation 8, when the refractive index of a high refractive index part ($n_H$) was set at 1.40 and the depth h of through-hole 122 was set at 435 nm, the diffraction efficiency for TE polarized light was simulated. FIG. 15 is a graph showing the correlations between light wavelength λ, and the transmission diffraction efficiency and reflection diffraction efficiency for TE polarized light. The abscissa in FIG. 15 indicates light wavelength λ (nm). In addition, the ordinate in FIG. 15 indicates transmission diffraction efficiency (%) or reflection diffraction efficiency (%). The solid line in FIG. 15 indicates the transmission diffraction efficiency for TE polarized light, and the broken line indicates the reflection diffraction efficiency for TE polarized light.

As shown in FIGS. 6A and 15, it was found that a region indicating high reflection diffraction efficiency for TE polarized light in a long wavelength band was considerably narrowed.

Although graphs are not specifically shown, Table 1 shows the reflection diffraction efficiency for TE polarized light, the transmission diffraction efficiency for TM polarized light, and light wavelength λ at which the reflection efficiency for TE polarized light exhibits 80% or more at the respective refractive indexes, when the pitch Λ of through-holes 122 was set at 600 nm and light wavelength λ was set at 650 nm.

TABLE 1

| Refractive Index | Optimum Grating Depth (nm) | Reflection Diffraction Efficiency for TE Polarized Light (%) | Transmission Diffraction Efficiency for TM Polarized Light (%) | Light Wavelength at which Reflection Efficiency for TE Polarized Light Exhibits 80% or more (nm) |
|---|---|---|---|---|
| 1.40 | 435 | 99.80 | 99.60 | 5.4 |
| 1.41 | 420 | 99.92 | 99.48 | 6.7 |
| 1.42 | 410 | 99.98 | 99.40 | 7.8 |
| 1.43 | 400 | 99.99 | 99.35 | 8.9 |
| 1.44 | 390 | 99.99 | 99.32 | 10.2 |
| 1.45 | 380 | 99.99 | 99.32 | 11.4 |
| 1.46 | 370 | 99.99 | 99.36 | 12.8 |
| 1.47 | 360 | 99.99 | 99.42 | 14.1 |
| 1.48 | 350 | 99.93 | 99.52 | 15.3 |
| 1.49 | 340 | 99.99 | 99.64 | 16.7 |
| 1.50 | 330 | 99.99 | 99.76 | 17.8 |
| 1.51 | 310 | 99.76 | 99.98 | 18.6 |
| 1.52 | 300 | 99.99 | 99.99 | 19.4 |
| 1.53 | 275 | 99.99 | 99.53 | 19.2 |
| 1.54 | 245 | 100.00 | 95.98 | 19.0 |
| 1.55 | 225 | 99.99 | 86.52 | 19.3 |
| 1.56 | 210 | 99.99 | 17.75 | 19.7 |
| 1.57 | 195 | 99.99 | 98.38 | 20.1 |
| 1.58 | 185 | 99.99 | 99.91 | 20.6 |
| 1.59 | 175 | 99.98 | 98.85 | 21.0 |
| 1.60 | 170 | 99.99 | 98.32 | 21.5 |
| 1.61 | 160 | 99.95 | 97.06 | 21.5 |
| 1.62 | 155 | 99.99 | 96.51 | 21.9 |
| 1.63 | 150 | 99.99 | 95.97 | 22.3 |
| 1.64 | 145 | 99.99 | 95.46 | 22.6 |
| 1.65 | 140 | 99.99 | 94.97 | 22.8 |
| 1.66 | 135 | 99.98 | 94.52 | 22.9 |

TABLE 1-continued

| Refractive Index | Optimum Grating Depth (nm) | Reflection Diffraction Efficiency for TE Polarized Light (%) | Transmission Diffraction Efficiency for TM Polarized Light (%) | Light Wavelength at which Reflection Efficiency for TE Polarized Light Exhibits 80% or more (nm) |
|---|---|---|---|---|
| 1.67 | 130 | 99.94 | 94.10 | 23.0 |
| 1.68 | 130 | 99.90 | 94.03 | 23.7 |
| 1.69 | 125 | 99.98 | 93.96 | 23.8 |
| 1.70 | 120 | 99.98 | 93.30 | 23.7 |

As described above, in order for polarizer 120 to function properly, it is preferable that polarizer 120 exhibits about 100% of transmission diffraction efficiency for TE polarized light and exhibits about 100% of reflection diffraction efficiency for TM polarized light. Here, when the reflection diffraction efficiency for TE polarized light was more than 98%, and the transmission diffraction efficiency for TM polarized light was more than 98%, it was considered that polarizer 120 functioned properly.

As shown in Table 1, it was found that, at a light wavelength λ of 650 nm, a polarizer functioned properly when the pitch Λ of through-holes 122 was 600 nm, and the refractive index of the high refractive index part ($n_H$) was within a range of from 1.44 to 1.53 or 1.57 or more.

Figure 1A:
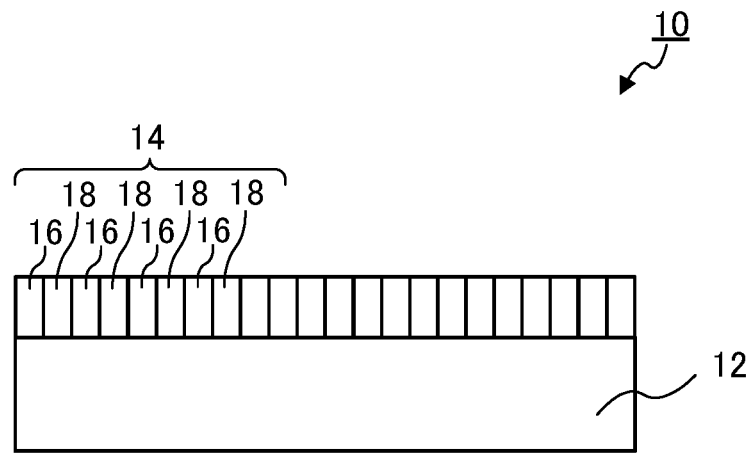
FIG. 1A is a sectional view of a guided-mode resonance filter having a substrate and a diffraction grating part.
Figure 1B:
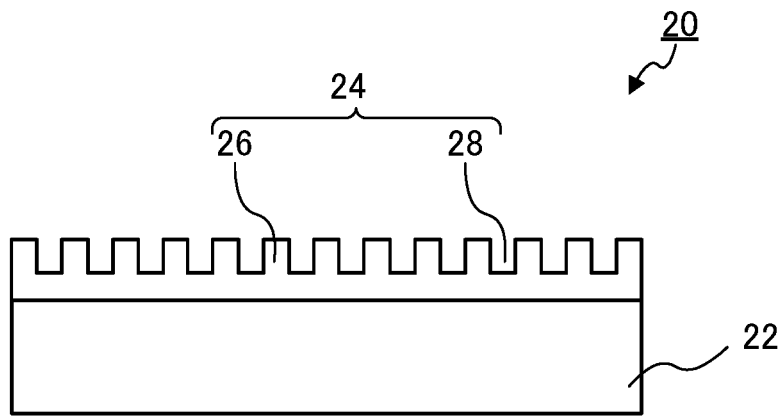
FIG. 1B is a sectional view of a guided-mode resonance filter having a substrate and a waveguide layer formed on the substrate.
Figure 2A:
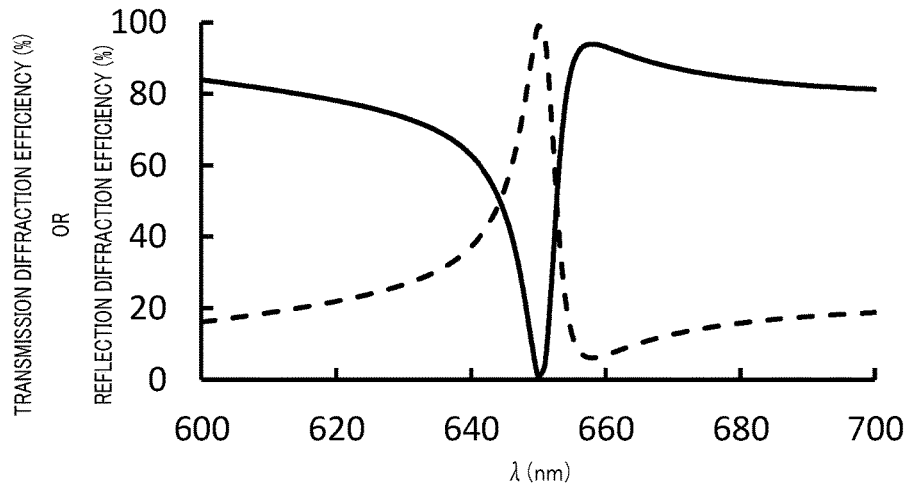
FIG. 2A is a graph showing the correlation between a light wavelength and transmission diffraction efficiency or reflection diffraction efficiency for TE polarized light.
Figure 2B:
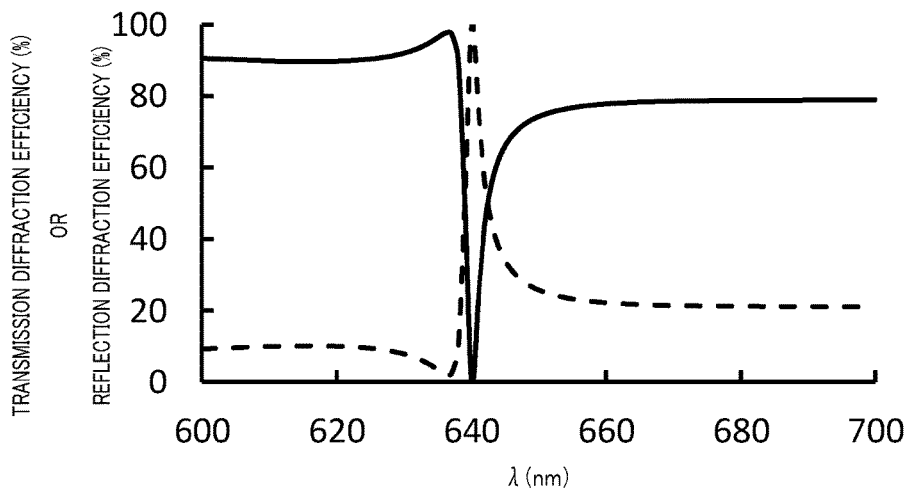
FIG. 2B is a graph showing the correlation between a light wavelength and transmission diffraction efficiency or reflection diffraction efficiency for TM polarized light, in a guided-mode resonance filter disclosed in NPL 2.

Further, as shown in FIG. 1, as the polarizer which is irradiated with light having a wavelength λ of 650 nm and in which the pitch Λ of through-holes 122 is 600 nm, it is preferable to use a polarizer in which the light wavelength at which the reflection efficiency for TE polarized light exhibits 80% or more is 10 nm or more. The reason for this is to address the vibration of an oscillation center wavelength due to temperature fluctuation or the like in a semiconductor laser. Further, in the case where polarizer 120 is used with a laser as a light source, it is also necessary to secure 10 nm or more of a wavelength band of an element to be used. Therefore, when the pitch Λ of through-holes 122 is 600 nm, the refractive index n of polarizer 120 (refractive index of the high refractive index part $n_H$) is preferably 1.44 or more. In addition, polarizers with refractive indexes of 1.55 and 1.56 have a transmission diffraction efficiency for TM polarized light of 90% or less, and thus cannot perform the function of the polarizer sufficiently. Further, when the refractive index n is 1.61 or more, Fresnel reflection is frequently observed, and thus, also in this case, polarizers cannot perform the function of the polarizer sufficiently, either.

Next, Tables 2 and 3 show optimum depth h of through-hole 122, the reflection diffraction efficiency for TE polarized light, the transmission diffraction efficiency for TM polarized light, and light wavelength λ at which the reflection efficiency for TE polarized light exhibits 80% or more, when changing the refractive index of a high refractive index part ($n_H$) of polarizer 120 with through-holes 122 having a pitch Λ of 590 nm.

TABLE 2

| Refractive Index | Optimum Grating Depth (nm) | Reflection Diffraction Efficiency for TE Polarized Light (%) | Transmission Diffraction Efficiency for TM Polarized Light (%) | Light Wavelength at which Reflection Efficiency for TE Polarized Light Exhibits 80% or more (nm) |
|---|---|---|---|---|
| 1.40 | 520 | 99.79 | 99.50 | 0.8 |
| 1.41 | 505 | 99.32 | 99.66 | 1.5 |
| 1.42 | 495 | 97.83 | 99.80 | 1.6 |
| 1.43 | 480 | 99.53 | 99.94 | 2.4 |
| 1.44 | 470 | 99.98 | 99.99 | 3.0 |
| 1.45 | 460 | 99.99 | 99.99 | 3.7 |
| 1.46 | 450 | 99.98 | 99.97 | 4.6 |
| 1.47 | 440 | 99.86 | 99.92 | 5.7 |
| 1.48 | 435 | 99.74 | 99.89 | 6.3 |
| 1.49 | 425 | 99.99 | 99.81 | 7.6 |
| 1.50 | 415 | 99.84 | 99.72 | 9.1 |
| 1.51 | 410 | 99.99 | 99.68 | 10.0 |
| 1.52 | 405 | 99.91 | 99.64 | 11.0 |
| 1.53 | 395 | 99.95 | 99.55 | 13.0 |
| 1.54 | 390 | 99.99 | 99.52 | 14.3 |
| 1.55 | 385 | 99.99 | 99.49 | 15.6 |
| 1.56 | 380 | 99.99 | 99.46 | 16.2 |
| 1.57 | 375 | 99.97 | 99.45 | 18.9 |
| 1.58 | 370 | 99.96 | 99.43 | 20.8 |
| 1.59 | 365 | 99.97 | 99.42 | 22.8 |
| 1.60 | 360 | 99.98 | 99.41 | 25.2 |
| 1.61 | 355 | 99.99 | 99.43 | 27.8 |
| 1.62 | 350 | 99.99 | 99.43 | 31.0 |
| 1.63 | 345 | 99.99 | 99.45 | 34.7 |
| 1.64 | 340 | 99.99 | 99.48 | 39.9 |

TABLE 3

| Refractive Index | Optimum Grating Depth (nm) | Reflection Diffraction Efficiency for TE Polarized Light (%) | Transmission Diffraction Efficiency for TM Polarized Light (%) | Light Wavelength at which Reflection Efficiency for TE Polarized Light Exhibits 80% or more (nm) |
|---|---|---|---|---|
| 1.65 | 335 | 99.99 | 99.52 | 50.0≤ |
| 1.66 | 330 | 99.99 | 99.56 | 50.0≤ |
| 1.67 | 330 | 99.99 | 99.55 | 50.0≤ |
| 1.68 | 325 | 99.99 | 99.60 | 50.0≤ |
| 1.69 | 325 | 99.99 | 99.59 | 50.0≤ |
| 1.70 | 320 | 100.00 | 99.64 | 50.0≤ |
| 1.71 | 320 | 99.99 | 99.63 | 50.0≤ |
| 1.72 | 315 | 100.00 | 99.69 | 50.0≤ |
| 1.73 | 315 | 99.99 | 99.68 | 50.0≤ |
| 1.74 | 310 | 99.99 | 99.74 | 50.0≤ |
| 1.75 | 310 | 99.99 | 99.73 | 50.0≤ |
| 1.76 | 305 | 99.99 | 99.79 | 50.0≤ |
| 1.78 | 300 | 99.99 | 99.84 | 50.0≤ |
| 1.80 | 280 | 99.99 | 100.00 | 50.0≤ |
| 1.82 | 275 | 99.99 | 99.99 | 50.0≤ |
| 1.85 | 270 | 99.99 | 99.96 | 50.0≤ |
| 1.90 | 260 | 99.99 | 99.83 | 50.0≤ |
| 1.95 | 250 | 99.99 | 99.54 | 50.0≤ |
| 2.00 | 240 | 99.99 | 99.04 | 50.0≤ |
| 2.05 | 235 | 99.97 | 98.74 | 50.0≤ |
| 2.08 | 230 | 99.98 | 98.33 | 50.0≤ |
| 2.09 | 225 | 99.98 | 97.80 | 50.0≤ |
| 2.10 | 225 | 99.99 | 97.82 | 50.0≤ |
| 2.15 | 220 | 99.99 | 97.26 | 50.0≤ |

Next, Table 4 shows optimum depth h of through-hole 122, the reflection diffraction efficiency for TE polarized light, the transmission diffraction efficiency for TM polarized light, and light wavelength λ at which the reflection efficiency for TE polarized light exhibits 80% or more, when changing the refractive index of a high refractive index part ($n_H$) of polarizer 120 with through-holes 122 having a pitch Λ of 580 nm.

TABLE 4

| Refractive Index | Optimum Grating Depth (nm) | Reflection Diffraction Efficiency for TE Polarized Light (%) | Transmission Diffraction Efficiency for TM Polarized Light (%) | Light Wavelength at which Reflection Efficiency for TE Polarized Light Exhibits 80% or more (nm) |
|---|---|---|---|---|
| 1.46 | 520 | 46.58 | 97.88 | — |
| 1.47 | 510 | 98.84 | 98.23 | 0.5 |
| 1.48 | 500 | 98.05 | 98.57 | 0.8 |
| 1.49 | 490 | 97.56 | 98.90 | 1.2 |
| 1.50 | 480 | 99.05 | 99.19 | 1.7 |
| 1.51 | 470 | 99.97 | 99.45 | 2.3 |
| 1.52 | 460 | 99.51 | 99.66 | 3.1 |
| 1.53 | 455 | 99.31 | 99.71 | 3.6 |
| 1.54 | 445 | 99.90 | 99.86 | 4.6 |
| 1.55 | 440 | 99.78 | 99.89 | 5.1 |
| 1.56 | 430 | 99.60 | 99.97 | 6.5 |
| 1.57 | 425 | 99.95 | 99.98 | 7.3 |
| 1.58 | 420 | 99.99 | 99.99 | 8.1 |
| 1.59 | 415 | 99.95 | 99.99 | 9.1 |
| 1.60 | 410 | 99.91 | 99.99 | 10.0 |
| 1.61 | 405 | 99.94 | 99.99 | 11.3 |
| 1.62 | 400 | 99.94 | 99.99 | 12.5 |
| 1.63 | 395 | 99.97 | 99.98 | 14.0 |
| 1.64 | 390 | 99.99 | 99.97 | 15.4 |
| 1.65 | 385 | 99.99 | 99.96 | 17.1 |
| 1.66 | 380 | 99.95 | 99.94 | 19.0 |
| 1.67 | 380 | 99.89 | 99.97 | 19.2 |
| 1.68 | 375 | 99.98 | 99.95 | 21.4 |
| 1.69 | 370 | 99.99 | 99.94 | 23.7 |
| 1.70 | 370 | 99.89 | 99.92 | 23.9 |
| 1.71 | 365 | 99.99 | 99.95 | 26.6 |
| 1.75 | 355 | 99.95 | 99.97 | 33.6 |
| 1.80 | 340 | 99.97 | 99.98 | 49.3 |
| 1.85 | 325 | 99.67 | 99.99 | ≥50.0 |
| 1.90 | 325 | 99.99 | 99.98 | ≥50.0 |
| 1.95 | 315 | 99.97 | 99.76 | ≥50.0 |
| 2.00 | 310 | 99.99 | 99.29 | ≥50.0 |
| 2.05 | 305 | 99.97 | 98.43 | ≥50.0 |

TABLE 4-continued

| Refractive Index | Optimum Grating Depth (nm) | Reflection Diffraction Efficiency for TE Polarized Light (%) | Transmission Diffraction Efficiency for TM Polarized Light (%) | Light Wavelength at which Reflection Efficiency for TE Polarized Light Exhibits 80% or more (nm) |
|---|---|---|---|---|
| 2.10 | 295 | 99.96 | 98.09 | ≥50.0 |
| 2.11 | 295 | 99.99 | 97.66 | ≥50.0 |

As shown in Tables 1 to 4, results were obtained, in which polarizers 120 with through-holes 122 having pitches Λ of 580, 590, and 600 nm exhibited similar tendencies. However, it was found that, when the refractive index of the high refractive index part ($n_H$) was increased, the reflection width of the reflection diffraction efficiency in polarizer 120 with through-holes 122 having a pitch Λ of 590 nm became considerably wider than that of polarizer 120 with through-holes 122 having a pitch Λ of 600 nm. Further, it was found that, when the refractive index of the high refractive index part ($n_H$) was increased, the reflection width of the reflection diffraction efficiency in polarizer 120 with through-holes 122 having a pitch Λ of 580 nm became still wider than that of polarizer 120 with through-holes 122 having a pitch Λ of 590 nm.

As described above, in order for polarizer 120 to function properly, it is preferable that polarizer 120 exhibits about 100% of transmission diffraction efficiency for TE polarized light and exhibits about 100% of reflection diffraction efficiency for TM polarized light. Here, when the reflection diffraction efficiency for TE polarized light was more than 98%, and the transmission diffraction efficiency for TM polarized light was more than 98%, it was considered that polarizer 120 functioned properly.

As shown in Tables 1 to 4, it was found that, at a light wavelength λ of 650 nm, a polarizer functioned properly when the pitch Λ of through-holes 122 was 600 nm, and the refractive index of the high refractive index part ($n_H$) was within a range of from 1.44 to 1.55 or 1.57 or more. In addition, it was found that a polarizer functioned properly when the pitch Λ of through-holes 122 was 590 nm, and the refractive index of the high refractive index part ($n_H$) was within a range of from 1.51 to 2.08. Further, it was found that a polarizer functioned properly when the pitch Λ of through-holes 122 was 580 nm, and the refractive index of the high refractive index part ($n_H$) was within a range of from 1.60 to 2.10.

(Simulation 9)

Figure 16A:
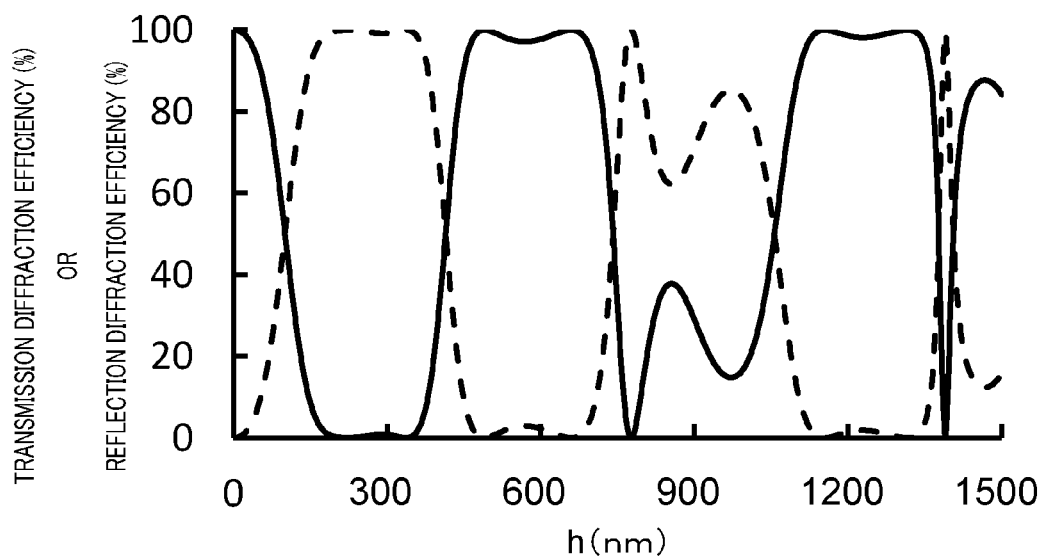
FIG. 16A is a graph showing the correlation between through-hole depth and transmission diffraction efficiency or reflection diffraction efficiency for TE polarized light.
Figure 16B:
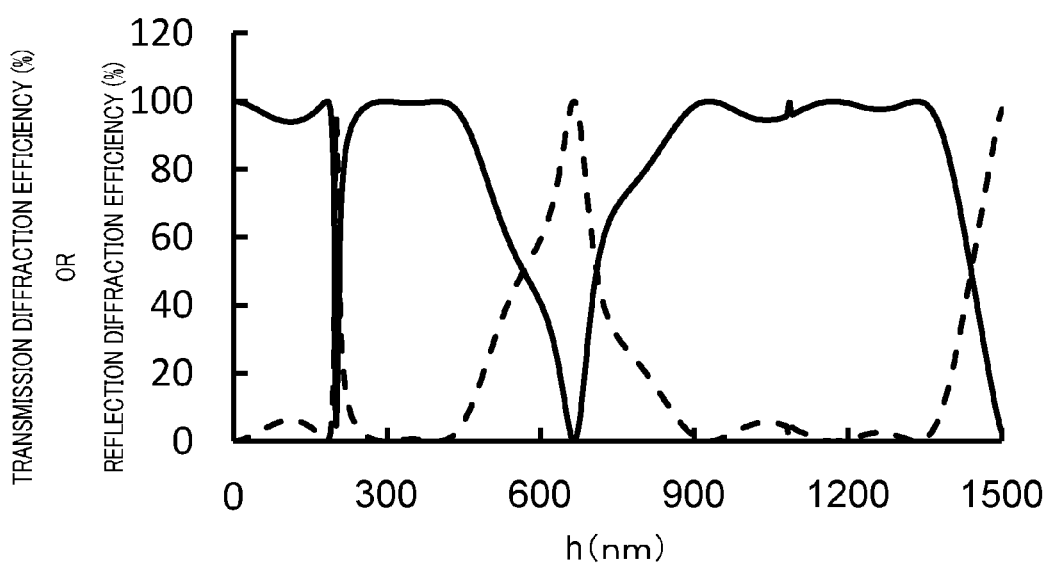
FIG. 16B is a graph showing the correlation between through-hole depth and transmission diffraction efficiency or reflection diffraction efficiency for TM polarized light, when the refractive index of high refractive index part ($n_H$) is set at 1.65.

As one example, when the refractive index of a high refractive index part ($n_H$) was 1.65, the correlations between the depth h of through-hole 122, and the transmission diffraction efficiency and reflection diffraction efficiency for TE polarized light and TM polarized light were simulated. FIG. 16A is a graph showing the correlations between the depth h of through-hole 122, and the transmission diffraction efficiency and reflection diffraction efficiency for TE polarized light. FIG. 16B is a graph showing the correlations between the depth h of through-hole 122, and the transmission diffraction efficiency and reflection diffraction efficiency for TM polarized light. The abscissa in FIGS. 16A and 16B indicates the depth h (nm) of through-hole 122. In addition, the ordinate in FIGS. 16A and 16B indicates transmission diffraction efficiency (%) or reflection diffraction efficiency (%). The solid line in FIG. 16A indicates the transmission diffraction efficiency for TE polarized light, and the broken line indicates the reflection diffraction efficiency for TE polarized light. Further, the solid line in FIG. 16B indicates the transmission diffraction efficiency for TM polarized light, and the broken line indicates the reflection diffraction efficiency for TM polarized light.

As shown in FIGS. 16A and 16B, the reflection diffraction efficiency was maximum (99.9%) when the depth h of through-hole 122 was 330 nm.

Figure 17A:
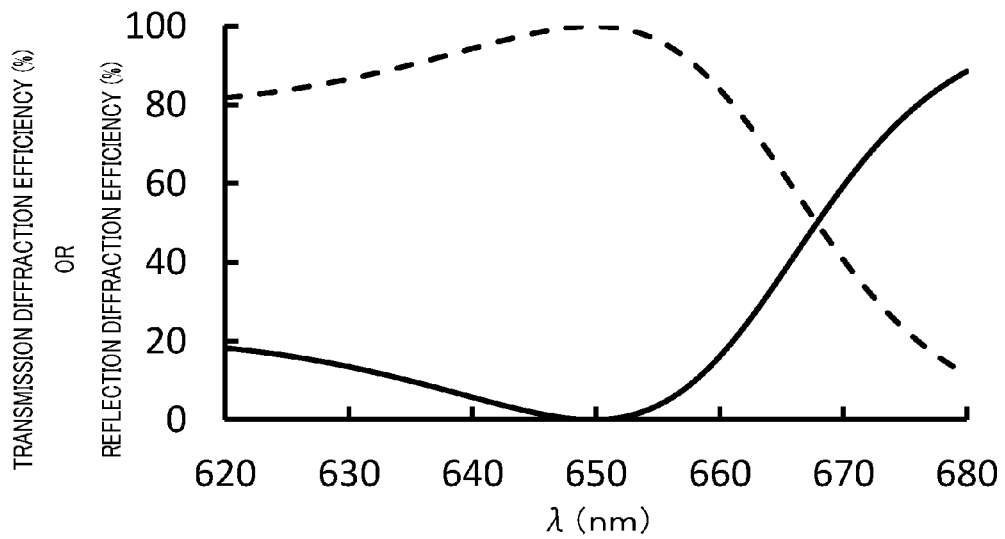
FIG. 17A is a graph showing the correlation between a light wavelength and transmission diffraction efficiency or reflection diffraction efficiency for TE polarized light.
Figure 17B:
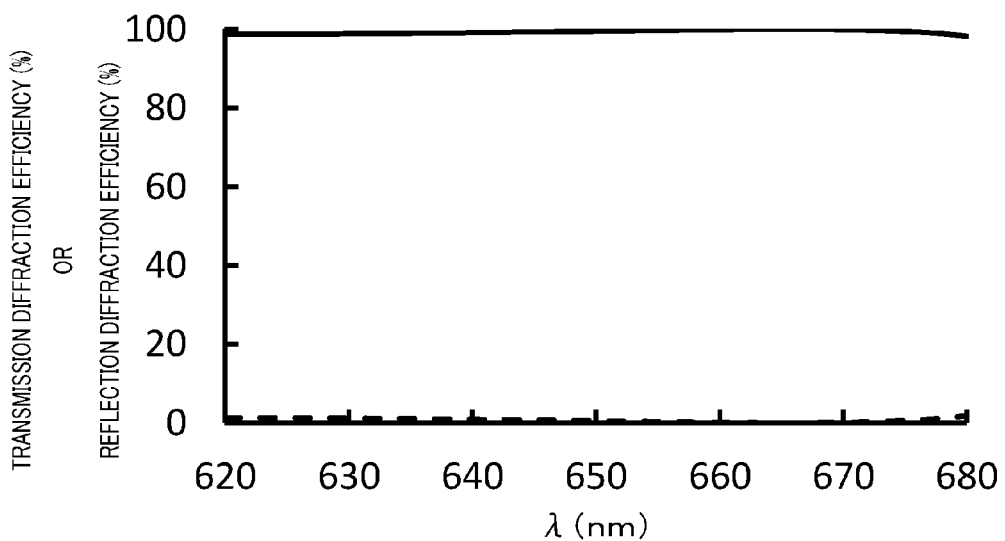
FIG. 17B is a graph showing the correlation between a light wavelength and transmission diffraction efficiency or reflection diffraction efficiency for TM polarized light, when the refractive index of high refractive index part ($n_H$) is set at 1.65, and through-hole depth h is set at 335 nm

Next, when the refractive index of the high refractive index part ($n_H$) was set at 1.65 and the depth h of through-hole 122 was set at 335 nm, the diffraction efficiency for TE polarized light and the diffraction efficiency for TM polarized light were simulated. FIG. 17A is a graph showing the correlations between light wavelength λ, and the transmission diffraction efficiency and reflection diffraction efficiency for TE polarized light. FIG. 17B is a graph showing the correlations between light wavelength λ, and the transmission diffraction efficiency and reflection diffraction efficiency for TM polarized light. The abscissa in FIGS. 17A and 17B indicates light wavelength λ (nm). In addition, the ordinate in FIGS. 17A and 17B indicates transmission diffraction efficiency (%) or reflection diffraction efficiency (%). The solid line in FIG. 17A indicates the transmission diffraction efficiency for TE polarized light, and the broken line indicates the reflection diffraction efficiency for TE polarized light. The solid line in FIG. 17B indicates the transmission diffraction efficiency for TM polarized light, and the broken line indicates the reflection diffraction efficiency for TM polarized light.

As shown in FIGS. 17A and 17B, it was found that the wavelength band of the reflection diffraction efficiency for TE polarized light was considerably wide.

Next, Table 5 shows optimum depth h of through-hole 122, the reflection diffraction efficiency for TE polarized light, the transmission diffraction efficiency for TM polarized light, and light wavelength λ at which the reflection efficiency for TE polarized light exhibits 80% or more, when changing the refractive index of a high refractive index part ($n_H$) of polarizer 120 with through-holes 122 having a pitch Λ of 489 nm, with a diffraction grating having a filling factor f of 0.5, and at a light wavelength λ of 530 nm.

TABLE 5

| Refractive Index | Optimum Grating Depth (nm) | Reflection Diffraction Efficiency for TE Polarized Light (%) | Transmission Diffraction Efficiency for TM Polarized Light (%) | Light Wavelength at which Reflection Efficiency for TE Polarized Light Exhibits 80% or more (nm) |
|---|---|---|---|---|
| 1.40 | 355 | 99.99 | 99.62 | 4.3 |
| 1.41 | 345 | 99.99 | 99.51 | 5.3 |

TABLE 5-continued

| Refractive Index | Optimum Grating Depth (nm) | Reflection Diffraction Efficiency for TE Polarized Light (%) | Transmission Diffraction Efficiency for TM Polarized Light (%) | Light Wavelength at which Reflection Efficiency for TE Polarized Light Exhibits 80% or more (nm) |
|---|---|---|---|---|
| 1.42 | 335 | 99.84 | 99.42 | 6.3 |
| 1.43 | 330 | 99.95 | 99.36 | 6.9 |
| 1.44 | 320 | 99.99 | 99.32 | 8.2 |
| 1.45 | 315 | 99.99 | 99.29 | 8.6 |
| 1.46 | 295 | 99.99 | 99.41 | 10.8 |
| 1.47 | 285 | 99.99 | 99.55 | 11.9 |
| 1.48 | 275 | 99.99 | 99.70 | 12.5 |
| 1.49 | 265 | 99.99 | 99.85 | 13.8 |
| 1.50 | 255 | 99.99 | 99.97 | 14.5 |
| 1.51 | 240 | 99.99 | 99.94 | 14.9 |
| 1.52 | 220 | 99.99 | 99.05 | 14.8 |
| 1.53 | 200 | 99.99 | 95.95 | 15.0 |
| 1.54 | 185 | 99.99 | 87.85 | 15.2 |
| 1.55 | 170 | 99.99 | 10.92 | 15.5 |
| 1.56 | 160 | 99.99 | 98.43 | 15.9 |
| 1.57 | 155 | 99.97 | 99.87 | 16.3 |
| 1.58 | 145 | 99.99 | 99.14 | 16.6 |
| 1.59 | 140 | 99.99 | 98.47 | 16.9 |
| 1.60 | 135 | 99.97 | 97.75 | 17.3 |
| 1.61 | 130 | 99.95 | 97.04 | 17.5 |
| 1.62 | 125 | 99.97 | 96.35 | 17.8 |
| 1.63 | 120 | 99.98 | 95.70 | 17.9 |
| 1.64 | 115 | 99.99 | 95.10 | 18.1 |
| 1.65 | 110 | 99.93 | 94.57 | 18.0 |
| 1.66 | 110 | 99.90 | 94.51 | 18.6 |
| 1.67 | 105 | 99.99 | 94.02 | 18.6 |
| 1.68 | 100 | 99.87 | 93.62 | 18.3 |
| 1.69 | 100 | 99.96 | 93.51 | 19.0 |
| 1.70 | 95 | 99.92 | 93.17 | 18.7 |
| 1.75 | 85 | 99.78 | 92.35 | 19.5 |

Next, Table 6 shows optimum depth h of through-hole 122, the reflection diffraction efficiency for TE polarized light, the transmission diffraction efficiency for TM polarized light, and light wavelength λ at which the reflection efficiency for TE polarized light exhibits 80% or more, when changing the refractive index of a high refractive index part ($n_H$) of polarizer 120 with through-holes 122 having a pitch Λ of 481 nm, with a diffraction grating having a filling factor f of 0.5, and at a light wavelength λ of 530 nm.

TABLE 6

| Refractive Index | Optimum Grating Depth (nm) | Reflection Diffraction Efficiency for TE Polarized Light (%) | Transmission Diffraction Efficiency for TM Polarized Light (%) | Light Wavelength at which Reflection Efficiency for TE Polarized Light Exhibits 80% or more (nm) |
|---|---|---|---|---|
| 1.40 | 425 | 98.85 | 99.33 | 0.6 |
| 1.41 | 415 | 93.83 | 99.57 | 0.7 |
| 1.42 | 405 | 95.05 | 99.77 | 1.2 |
| 1.43 | 395 | 97.87 | 99.90 | 1.6 |
| 1.44 | 385 | 99.67 | 99.98 | 2.2 |
| 1.45 | 375 | 99.91 | 99.99 | 3.0 |
| 1.46 | 370 | 99.21 | 99.98 | 3.5 |
| 1.47 | 360 | 99.98 | 99.39 | 4.4 |
| 1.48 | 355 | 99.79 | 99.70 | 5.0 |
| 1.49 | 345 | 99.77 | 99.79 | 6.9 |
| 1.50 | 340 | 99.97 | 99.74 | 7.1 |
| 1.51 | 335 | 99.99 | 99.69 | 8.0 |
| 1.52 | 330 | 99.97 | 99.64 | 9.0 |
| 1.53 | 325 | 99.60 | 99.59 | 10.0 |
| 1.54 | 320 | 99.96 | 99.54 | 11.2 |
| 1.55 | 315 | 99.97 | 99.50 | 12.5 |
| 1.56 | 310 | 99.99 | 99.47 | 13.9 |
| 1.57 | 305 | 99.99 | 99.44 | 15.5 |
| 1.58 | 300 | 99.99 | 99.43 | 17.3 |
| 1.59 | 295 | 99.98 | 99.43 | 19.3 |
| 1.60 | 290 | 99.95 | 99.42 | 21.4 |
| 1.61 | 290 | 99.98 | 99.42 | 22.5 |
| 1.62 | 285 | 99.99 | 99.44 | 25.3 |
| 1.63 | 280 | 99.98 | 99.47 | 28.9 |
| 1.64 | 280 | 99.99 | 99.46 | 30.7 |
| 1.65 | 275 | 99.99 | 99.50 | 39.5 |
| 1.66 | 275 | 99.97 | 99.49 | 50.0≤ |
| 1.67 | 270 | 99.99 | 99.54 | 50.0≤ |

TABLE 6-continued

| Refractive Index | Optimum Grating Depth (nm) | Reflection Diffraction Efficiency for TE Polarized Light (%) | Transmission Diffraction Efficiency for TM Polarized Light (%) | Light Wavelength at which Reflection Efficiency for TE Polarized Light Exhibits 80% or more (nm) |
|---|---|---|---|---|
| 1.68 | 265 | 99.99 | 99.60 | 50.0≤ |
| 1.69 | 260 | 99.98 | 99.96 | 50.0≤ |
| 1.70 | 230 | 99.94 | 99.96 | 50.0≤ |
| 1.75 | 225 | 99.99 | 99.94 | 50.0≤ |
| 1.80 | 225 | 99.99 | 99.98 | 50.0≤ |
| 1.85 | 220 | 99.96 | 99.96 | 50.0≤ |
| 1.90 | 210 | 99.99 | 99.75 | 50.0≤ |
| 1.95 | 205 | 99.98 | 99.60 | 50.0≤ |
| 2.00 | 200 | 99.99 | 99.37 | 50.0≤ |
| 2.05 | 190 | 99.99 | 98.56 | 50.0≤ |
| 2.10 | 185 | 99.98 | 98.02 | 50.0≤ |
| 2.11 | 185 | 99.96 | 98.04 | 50.0≤ |
| 2.12 | 180 | 99.97 | 97.31 | 50.0≤ |
| 2.13 | 180 | 99.99 | 97.32 | 50.0≤ |
| 2.14 | 180 | 99.99 | 97.34 | 50.0≤ |
| 2.15 | 180 | 99.98 | 97.35 | 50.0≤ |

Next, Table 7 shows optimum depth h of through-hole 122, the reflection diffraction efficiency for TE polarized light, the transmission diffraction efficiency for TM polarized light, and light wavelength λ at which the reflection efficiency for TE polarized light exhibits 80% or more, when changing the refractive index of a high refractive index part ($n_H$) of polarizer 120 with through-holes 122 having a pitch Λ of 472 nm, with a diffraction grating having a filling factor f of 0.5, and at a light wavelength λ of 530 nm.

TABLE 7

| Refractive Index | Optimum Grating Depth (nm) | Reflection Diffraction Efficiency for TE Polarized Light (%) | Transmission Diffraction Efficiency for TM Polarized Light (%) | Light Wavelength at which Reflection Efficiency for TE Polarized Light Exhibits 80% or more (nm) |
|---|---|---|---|---|
| 1.40 | 530 | 98.26 | 94.19 | 0.7 |
| 1.41 | 510 | 95.26 | 93.99 | 0.5 |
| 1.42 | 490 | 94.08 | 94.33 | 0.3 |
| 1.43 | — | — | — | — |
| 1.44 | — | — | — | — |
| 1.45 | — | — | — | — |
| 1.46 | — | — | — | — |
| 1.47 | — | — | — | — |
| 1.48 | 415 | 83.83 | 97.97 | 0.5 |
| 1.49 | 405 | 99.49 | 98.48 | 0.7 |
| 1.50 | 395 | 96.90 | 98.95 | 1.2 |
| 1.51 | 390 | 97.94 | 99.06 | 1.5 |
| 1.52 | 380 | 98.55 | 99.44 | 2.1 |
| 1.53 | 375 | 99.96 | 99.53 | 2.4 |
| 1.54 | 370 | 99.09 | 99.62 | 2.8 |
| 1.55 | 360 | 98.52 | 99.84 | 3.9 |
| 1.56 | 355 | 99.33 | 99.89 | 4.6 |
| 1.57 | 350 | 99.62 | 99.93 | 5.3 |
| 1.58 | 345 | 99.69 | 99.96 | 6.2 |
| 1.59 | 340 | 99.67 | 99.98 | 7.0 |
| 1.60 | 335 | 99.55 | 99.99 | 8.0 |
| 1.61 | 335 | 99.68 | 99.98 | 8.0 |
| 1.62 | 330 | 99.92 | 99.99 | 9.1 |
| 1.63 | 325 | 99.99 | 99.99 | 10.3 |
| 1.64 | 320 | 99.90 | 99.95 | 11.8 |
| 1.65 | 315 | 99.65 | 99.97 | 13.4 |
| 1.66 | 315 | 99.99 | 99.99 | 13.5 |
| 1.67 | 310 | 99.93 | 99.97 | 15.2 |
| 1.68 | 310 | 99.90 | 99.99 | 15.4 |
| 1.69 | 305 | 99.99 | 99.97 | 17.5 |
| 1.70 | 305 | 99.84 | 99.99 | 17.6 |
| 1.75 | 290 | 99.99 | 99.98 | 26.5 |
| 1.80 | 280 | 99.98 | 99.99 | 35.4 |
| 1.85 | 275 | 99.92 | 99.94 | 39.2 |
| 1.90 | 265 | 99.99 | 99.88 | 50.0≤ |
| 1.95 | 260 | 99.99 | 99.59 | 50.0≤ |
| 2.00 | 255 | 99.97 | 99.04 | 50.0≤ |
| 2.05 | 250 | 99.94 | 98.17 | 50.0≤ |
| 2.06 | 245 | 99.93 | 98.67 | 50.0≤ |
| 2.07 | 245 | 99.98 | 98.35 | 50.0≤ |
| 2.08 | 245 | 99.99 | 97.96 | 50.0≤ |
| 2.09 | 245 | 99.97 | 97.49 | 50.0≤ |

TABLE 7-continued

| Refractive Index | Optimum Grating Depth (nm) | Reflection Diffraction Efficiency for TE Polarized Light (%) | Transmission Diffraction Efficiency for TM Polarized Light (%) | Light Wavelength at which Reflection Efficiency for TE Polarized Light Exhibits 80% or more (nm) |
|---|---|---|---|---|
| 2.10 | 245 | 99.91 | 96.94 | 50.0≤ |
| 2.15 | 235 | 99.91 | 97.14 | 50.0≤ |
| 2.20 | 230 | 99.92 | 95.89 | 50.0≤ |

As shown in Tables 5 to 7, it was found that, at a light wavelength λ of 530 nm, a polarizer functioned properly when the pitch Λ of through-holes 122 was 489 nm, and the refractive index of the high refractive index part ($n_H$) was within a range of from 1.46 to 1.52 or from 1.56 to 1.59. In addition, it was found that, at a light wavelength λ of 530 nm, a polarizer functioned properly when the pitch Λ of through-holes 122 was 481 nm, and the refractive index of the high refractive index part ($n_H$) was within a range of from 1.53 to 2.11. Further, it was found that a polarizer functioned properly when the pitch Λ of through-holes 122 was 472 nm, and the refractive index of the high refractive index part ($n_H$) was within a range of from 1.63 to 2.07.

Further, as shown in FIGS. 1 to 7, depending on light wavelength λ to be irradiated and refractive index n of polarizer 120, the optimum depth h of through-hole 122, the pitch Λ of through-holes 122, or the like varies. Accordingly, it is better to appropriately select the optimum depth h of through-hole 122 or the pitch Λ of through-holes 122 depending on light wavelength λ to be irradiated and refractive index n of polarizer 120.

(Simulation 10)

In Simulation 10, the correlations of filling factor f with optimum depth h of through-hole 122, the reflection diffraction efficiency for TE polarized light, the transmission diffraction efficiency for TM polarized light and light wavelength λ at which the reflection efficiency for TE polarized light exhibits 80% or more were simulated.

Table 8 shows the optimum depth h of through-hole 122, the reflection diffraction efficiency for TE polarized light, the transmission diffraction efficiency for TM polarized light, and light wavelength λ at which the reflection efficiency for TE polarized light exhibits 80% or more, when changing filling factor f, in the case where light wavelength λ to be irradiated was 650 nm, the pitch Λ of through-holes 122 was 600 nm, and the refractive index of a high refractive index part ($n_H$) of polarizer 120 was 1.44.

TABLE 8

| Filling Factor (f) | Optimum Grating Depth (nm) | Reflection Diffraction Efficiency for TE Polarized Light (%) | Transmission Diffraction Efficiency for TM Polarized Light (%) | Light Wavelength at which Reflection Efficiency for TE Polarized Light Exhibits 80% or more (nm) |
|---|---|---|---|---|
| 0.60 | 295 | 99.99 | 99.79 | 9.7 |
| 0.55 | 355 | 99.99 | 99.31 | 10.7 |
| 0.50 | 390 | 99.99 | 99.32 | 10.2 |
| 0.45 | 405 | 99.99 | 99.99 | 9.9 |
| 0.40 | 405 | 99.99 | 49.96 | 10.5 |
| 0.35 | 400 | 99.99 | 96.22 | 10.7 |
| 0.30 | 400 | 99.99 | 98.28 | 9.5 |

Next, Table 9 shows the optimum depth h of through-hole 122, the reflection diffraction efficiency for TE polarized light, the transmission diffraction efficiency for TM polarized light, and light wavelength λ at which the reflection efficiency for TE polarized light exhibits 80% or more, when changing filling factor f, in the case where light wavelength λ to be irradiated was 650 nm, the pitch Λ of through-holes 122 was 600 nm, and the refractive index of a high refractive index part ($n_H$) of polarizer 120 was 1.6.

TABLE 9

| Filling Factor (f) | Optimum Grating Depth (nm) | Reflection Diffraction Efficiency for TE Polarized Light (%) | Transmission Diffraction Efficiency for TM Polarized Light (%) | Light Wavelength at which Reflection Efficiency for TE Polarized Light Exhibits 80% or more (nm) |
|---|---|---|---|---|
| 0.60 | 145 | 99.78 | 94.88 | 15.9 |
| 0.55 | 160 | 99.99 | 97.58 | 18.6 |
| 0.50 | 170 | 99.99 | 98.32 | 21.5 |
| 0.45 | 315 | 99.33 | 99.98 | 42.0 |
| 0.40 | 325 | 99.97 | 0.01 | 18.6 |
| 0.35 | 330 | 97.86 | 64.0 | 41.8 |

Next, Table 10 shows the optimum depth h of through-hole 122, the reflection diffraction efficiency for TE polarized light, the transmission diffraction efficiency for TM polarized light, and light wavelength λ at which the reflection efficiency for TE polarized light exhibits 80% or more, when changing filling factor f, in the case where light wavelength λ to be irradiated was 650 nm, the pitch Λ of through-holes 122 was 600 nm, and the refractive index of the high refractive index part ($n_H$) of polarizer 120 was 1.52.

TABLE 10

| Filling Factor (f) | Optimum Grating Depth (nm) | Reflection Diffraction Efficiency for TE Polarized Light (%) | Transmission Diffraction Efficiency for TM Polarized Light (%) | Light Wavelength at which Reflection Efficiency for TE Polarized Light Exhibits 80% or more (nm) |
|---|---|---|---|---|
| 0.60 | 200 | 99.97 | 94.09 | 12.8 |
| 0.55 | 235 | 99.99 | 97.70 | 15.3 |
| 0.50 | 300 | 99.99 | 99.99 | 19.4 |
| 0.45 | — | — | — | — |
| 0.40 | 330 | 99.99 | 6.29 | 21.7 |
| 0.35 | 275 | 99.99 | 99.45 | 19.4 |
| 0.30 | 270 | 99.99 | 99.94 | 17.3 |

As shown in FIGS. 8 to 10, when the filling factor f is less than 0.35 or not within a range of from 0.45 to 0.55, the reflection diffraction efficiency (%) for TE polarized light was lowered, and the reflection band for TE polarized light became narrow.

(Effect)

As has been described above, polarizer 120 according to the present embodiment does not have a substrate, with a plurality of through-holes being arranged at a constant interval, and thus the reduction in weight and thickness can be achieved. Further, polarizer 120 according to the present embodiment is capable of reducing Fresnel reflection, and of widening a wavelength band indicating high reflection diffraction efficiency for TE polarized light.

INDUSTRIAL APPLICABILITY

The polarizer according to the present invention is useful, for example, for enhancing the extinction ratio of polarized light from a light source, at a position immediately behind a red or green semiconductor laser.

REFERENCE SIGNS LIST 10, 20 Guided-mode resonance filter
12, 22 Substrate
14 Diffraction grating part
16, 26 High refractive index part
18, 28 Low refractive index part
24 waveguide layer
100 Optical element
120 Polarizer
122 Through-hole
124 Substantial part
140 Holder

The invention claimed is:
1. A polarizer comprising:
a thin film with a constant thickness composed of a dielectric; and
a plurality of slit-shaped through-holes each having a same width formed in the thin film and extending in a first direction,
wherein
the plurality of through-holes are arranged on a surface of the thin film at a constant interval in a second direction perpendicular to the first direction, and
the plurality of through-holes open to both a first face and a second face of the thin film, the second face being in front-rear relationship with the first face.

2. The polarizer according to claim 1, wherein the dielectric is transparent resin or glass.

3. The polarizer according to claim 1, wherein a center-to-center distance of the plurality of through-holes in the second direction is within a range of from 580 to 600 nm.

4. The polarizer according to claim 1,
wherein
a center-to-center distance of the plurality of through-holes in the second direction is 600 nm, and
a refractive index of the dielectric is within a range of from 1.44 to 1.53 or 1.57 or more.

5. The polarizer according to claim 4, wherein the refractive index of the dielectric is within a range of from 1.57 to 1.60.

6. The polarizer according to claim 1,
wherein
a center-to-center distance of the plurality of through-holes in the second direction is 590 nm, and
a refractive index of the dielectric is within a range of from 1.51 to 2.08.

7. The polarizer according to claim 1,
wherein
a center-to-center distance of the plurality of through-holes in the second direction is 580 nm, and
a refractive index of the dielectric is within a range of from 1.60 to 2.10.

8. The polarizer according to claim 1, wherein a center-to-center distance of the plurality of through-holes in the second direction is within a range of from 470 to 490 nm.

9. The polarizer according to claim 1,
wherein
a center-to-center distance of the plurality of through-holes in the second direction is 489 nm, and
a refractive index of the dielectric is within a range of from 1.46 to 1.54 or from 1.56 to 1.59.

10. The polarizer according to claim 1,
wherein
a center-to-center distance of the plurality of through-holes in the second direction is 481 nm, and
a refractive index of the dielectric is 1.53 or more.

11. The polarizer according to claim 10, wherein the refractive index of the dielectric is within a range of from 1.53 to 2.11.

12. The polarizer according to claim 1,
wherein
a center-to-center distance of the plurality of through-holes in the second direction is 472 nm, and
a refractive index of the dielectric is within a range of from 1.63 to 2.07.

13. An optical element comprising:
the polarizer according to claim 1; and
a holder that holds the polarizer so as not to close the plurality of through-holes.

14. The optical element according to claim 13, wherein the holder is made of ceramic or metal.

15. The polarizer according to claim 1, wherein the polarizer does not have a substrate for supporting the thin film.

* * * * *